United States Patent
Ru et al.

(10) Patent No.: US 11,750,716 B2
(45) Date of Patent: Sep. 5, 2023

(54) METHODS FOR PUBLISHING RESOURCE, AND GATEWAY

(71) Applicant: GUANGDONG OPPO MOBILE TELECOMMUNICATIONS CORP., LTD., Guangdong (CN)

(72) Inventors: Zhao Ru, Dongguan (CN); Chaoming Luo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/072,820

(22) Filed: Dec. 1, 2022

(65) Prior Publication Data

US 2023/0093686 A1    Mar. 23, 2023

Related U.S. Application Data

(63) Continuation of application No. PCT/CN2020/096412, filed on Jun. 16, 2020.

(51) Int. Cl.
*H04L 67/565* (2022.01)
*H04L 65/102* (2022.01)

(52) U.S. Cl.
CPC .......... *H04L 67/565* (2022.05); *H04L 65/102* (2013.01)

(58) Field of Classification Search
None
See application file for complete search history.

(56) References Cited

U.S. PATENT DOCUMENTS 10,447,610 B1 * 10/2019 Shah .................... G06F 21/604
10,506,691 B2    12/2019 Klecha 2002/0083123 A1 * 6/2002 Freedman ............... H04L 61/00
                                                         709/219
2016/0275190 A1    9/2016 Seed et al.
2019/0075184 A1    3/2019 Seed, IV et al.
2019/0132932 A1    5/2019 Klecha et al.
2021/0211509 A1 * 7/2021 Ly ......................... H04L 67/51
(Continued)

FOREIGN PATENT DOCUMENTS

| CN | 101132420 A | 2/2008 |
|---|---|---|
| CN | 102752884 A | 10/2012 |
| CN | 105099882 A | 11/2015 |
| CN | 105766004 A | 7/2016 |
| CN | 105825462 A | 8/2016 |
| CN | 109155789 A | 1/2019 |

(Continued)

OTHER PUBLICATIONS

Joo-Chul Kevin Lee "Cloud Gateway functionality Gateway functionality to proxy devices to the cloud" CR2599—Cloud GW_v0.1-r2, Mar. 3, 2020.

(Continued)

*Primary Examiner* — Quang N Nguyen
(74) *Attorney, Agent, or Firm* — PERKINS COIE LLP

(57) ABSTRACT

A resource publishing method includes that: a gateway receives a first resource link of a resource to be published from a server; the gateway determines, based on an obtained identifier of the server and the first resource link of the resource to be published, a second resource link of the resource to be published; and the gateway sends the second resource link of the resource to be published to a cloud platform, where the second resource link of the resource to be published is used by the cloud platform to publish the resource to be published on a resource directory.

17 Claims, 19 Drawing Sheets

(56) References Cited

U.S. PATENT DOCUMENTS

| | | | |
|---|---|---|---|
| 2022/0014516 A1* | 1/2022 | Zhang | ................. H04L 63/0853 |
| 2022/0060560 A1* | 2/2022 | Zhang | ................. H04L 63/0807 |
| 2023/0045914 A1* | 2/2023 | Ru | ................... G05B 19/41855 |

FOREIGN PATENT DOCUMENTS

| | | |
|---|---|---|
| CN | 109196826 A | 1/2019 |
| EP | 4135265 A1 | 2/2023 |
| WO | 2018132557 A1 | 7/2018 |

OTHER PUBLICATIONS

Joo-Chul Kevin Lee "Cloud Gateway functionality Gateway functionality to proxy devices to the cloud" CR2599—Cloud GW_v0.1-r2.1, Mar. 3, 2020.

Joo-Chul Kevin Lee "Cloud Gateway functionality Gateway functionality to proxy devices to the cloud" CR2599—Cloud GW_v0.1-r3, Mar. 3, 2020.

Joo-Chul Kevin Lee "Cloud Gateway functionality Gateway functionality to proxy devices to the cloud" CR2599—Cloud 3W_v0.1-r3.2, Mar. 3, 2020.

Joo-Chul Kevin Lee "Cloud Gateway functionality Gateway functionality to proxy devices to the cloud" CR2599—Cloud GW_v0.1-r3.3, Mar. 3, 2020.

International Search Report in the international application No. PCT/CN2020/096412, dated Mar. 4, 2021.

English translation of the Written Opinion of the International Search Authority in the international application No. PCT/CN2020/096412, dated Mar. 4, 2021.

Supplementary European Search Report in the European application No. 20940883.0, dated May 11, 2023. 11 pages.

* cited by examiner

METHODS FOR PUBLISHING RESOURCE, AND GATEWAY

CROSS-REFERENCE TO RELATED APPLICATION

This application is a U.S. continuation application of International Application No. PCT/CN2020/096412, entitled "RESOURCE PUBLISHING METHOD AND APPARATUS, GATEWAY, CLOUD PLATFORM AND COMPUTER STORAGE MEDIUM", filed on Jun. 16, 2020, the disclosure of which is hereby incorporated by reference in its entirety.

TECHNICAL FIELD

Embodiments of the present disclosure relate to, but are not limited to, Internet of Things (IOT) technologies, and in particular, to methods for publishing a resource, and a gateway.

BACKGROUND

The IOT is an important part of a new generation of information technology. As the IOT scene becomes more and more complex, more and more devices exchange information, and the increase of server devices leads to the increase of the generated resources. How to provide a reasonable method for publishing the resources of the server devices is an urgent problem to be solved in the art.

SUMMARY

The embodiments of the present disclosure provide methods for publishing a resource, and a gateway.

In a first aspect, a method for publishing a resource is provided, and includes the following operations. A gateway receives a first resource link of a resource to be published from a server.

A second resource link of the resource to be published is determined based on an obtained identifier of the server and the first resource link of the resource to be published.

The second resource link of the resource to be published is sent to a cloud platform, where the second resource link of the resource to be published is used by the cloud platform to publish the resource to be published on a resource directory.

In a second aspect, a method for publishing a resource is provided, and includes the following operations. A cloud platform receives a second resource link of a resource to be published from a gateway.

A third resource link of the resource to be published is determined based on an obtained identifier of the gateway and the second resource link of the resource to be published.

The resource to be published is published on a resource directory based on the third resource link of the resource to be published.

In a third aspect, a gateway comprising a memory and a processor is provided.

The memory stores a computer program executable by the processor.

The processor is configured to execute the program to perform the operations of the foregoing corresponding method provided in the first aspect.

In the embodiments of the present disclosure, a gateway receives a first resource link of a resource to be published from a server; a second resource link of the resource to be published is determined based on an obtained identifier of the server and the first resource link of the resource to be published; the second resource link of the resource to be published is sent to a cloud platform, and the second resource link of the resource to be published is used by the cloud platform to publish the resource to be published on a resource directory. In this way, the gateway receives the first resource link of the resource to be published from the server, and sends the second resource link of the resource to be published to the cloud platform, so that the resource link of the resource to be published of the server is forwarded through the gateway, and the gateway can publish the resource instead of the server, so as to ensure that the resource link can be uploaded to the cloud unobstructed, thereby publishing the server's resources in a reasonable way.

DETAILED DESCRIPTION

The technical solutions of the present disclosure and how the technical solutions of the present disclosure solve the above-mentioned technical problems will be described in detail below by embodiments and with reference to the drawings. The following specific embodiments may be combined with each other, and the same or similar concepts or processes may not be described in some embodiments.

It should be noted that: in the embodiments of the present disclosure, "first", "second", and the like are used to distinguish similar objects without having to describe a particular order or sequence.

In addition, the technical solutions described in the embodiments of the present disclosure may be arbitrarily combined if there is no conflict.

Figure 1:
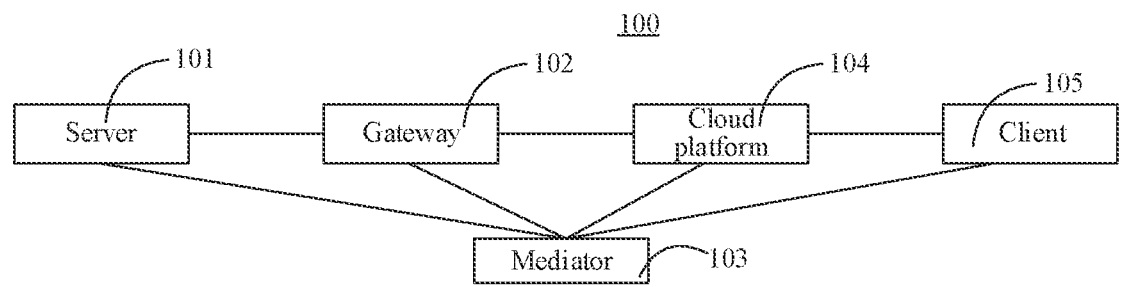
FIG. 1 is a schematic structural diagram of an IOT architecture according to an embodiment of the present disclosure.

FIG. 1 is a schematic structural diagram of an IOT architecture according to an embodiment of the present disclosure. As shown in FIG. 1, the IOT architecture 100 includes a server 101, a gateway 102, a mediator 103, a cloud platform 104, and a client 105.

The server 101 may be a server device, a bridged server, an Open Connectivity Foundation (OCF) server device, a resource device, a Device-to-Device (D2D) device, a Device-to-Client (D2C) device, or the like. The server 101 may be any device capable of providing a resource, for example, a kettle capable of providing a water temperature resource, an air conditioner capable of providing a resource that the air conditioner is turned on or off, or the like. The resource device may be a device capable of providing a resource, for example, the resource device may be used to provide a temperature resource or may provide a certain controlled object resource. The server 101 may upload a resource or a status of a resource to the cloud platform 104, or the server 101 may upload a resource or a status of a resource to the cloud platform 104 through the gateway 102. The state of the resource is, for example, a temperature value, state information of a controlled object, or the like.

The gateway 102 may be a cloud proxy, a cloud proxy platform, a cloud gateway, a cloud gateway platform, a gateway device, a cloud proxy device, an OCF gateway, or the like. The gateway 102 may also be a wireless access gateway, a home access gateway, a dial-up access gateway, a dedicated line access gateway, a Virtual Private Network (VPN) access gateway, an enterprise access gateway, or the like.

The mediator 103 may be any device capable of information configuration and may be a mediator. In one implementation, the mediator 103 may configure at least one of the server 101, the gateway 102, the cloud platform 104, and the client 105. For example, in one implementation, the mediator 103 may configure only the server 101, the gateway 102, and the client 105. In another implementation, the mediator may configure the server 101, the gateway 102, the cloud platform 104, and the client 105.

The cloud platform 104 may be a cloud, a cloud-side, a cloud device, an OCF cloud, or the like. The cloud platform 104 is used to display resources or resource states uploaded by the server 101 for query or retrieval by the client 105.

The client 105 may be a client, a cloud client, or an OCF cloud client. The cloud client may access the resources on the cloud platform 104 through the client 105, or initiate a request for querying the resource status to the cloud platform 104 to query the status of the resources.

The server 101, the mediator 103, or the client 105 in the embodiments of the present disclosure may be a mobile phone, a tablet computer, a notebook computer, a palmtop computer, a personal digital assistant, a portable media player, a smart speaker, a navigation device, a display device, a wearable device such as a smart band, a Virtual Reality (VR) device, an Augmented Reality (AR) device, a pedometer, a digital TV, a desktop computer, a terminal device in a 5G network, or the like.

Figure 2:
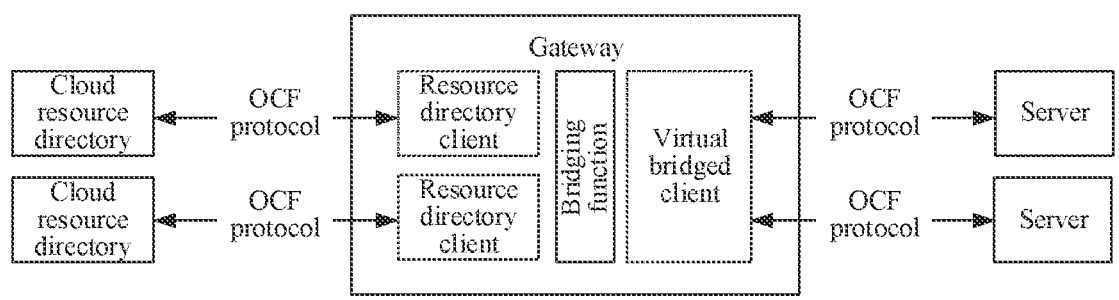
FIG. 2 is a schematic diagram of a scenario in which a server uploads a resource through a gateway according to an embodiment of the present disclosure.

FIG. 2 is a schematic diagram of a scenario in which a server uploads a resource through a gateway according to an embodiment of the present disclosure. As shown in FIG. 2, the gateway uploads the resources of the server to the cloud in the following manner.

Firstly, the gateway may discover a server in the network, or the server may discover a gateway. The gateway is connected to the server. Connecting the gateway to the server may include server registration and/or logging into the gateway.

Secondly, the gateway may connect to the server through a virtual bridged client to obtain the resource of the server. The resource herein may be a resource to be published in the embodiments of the present disclosure.

Thirdly, the gateway maps the resource of the server device to the Resource Directory (RD) client via a bridging function. In some implementations, the resource directory client may also be a virtual client.

The RD Client then publishes the mapped server device resource to the cloud resource directory of the cloud platform.

Finally, the cloud resource directory of the cloud platform is used to present the resource to the corresponding cloud user.

In some implementations, when the client obtains the state of the resource from the cloud, the cloud resource directory may send the obtained information to the resource directory client, and the virtual bridged client forwards the obtained information to the server, thereby obtaining the resource of the server. Accordingly, the server may send the status information of the resource to the virtual bridged client, and then the resource directory client sends the status of the resource to the cloud resource directory, and the cloud resource directory sends the status of the resource to the client, so that the user can see the status of the resource from the client.

The corresponding gateway in FIG. 2 may be the same gateway as in other embodiments. The server communicates with the virtual bridged client in the gateway via the OCF protocol. The resource directory client in the gateway communicates with the cloud resource directory via the OCF protocol.

Figure 3:
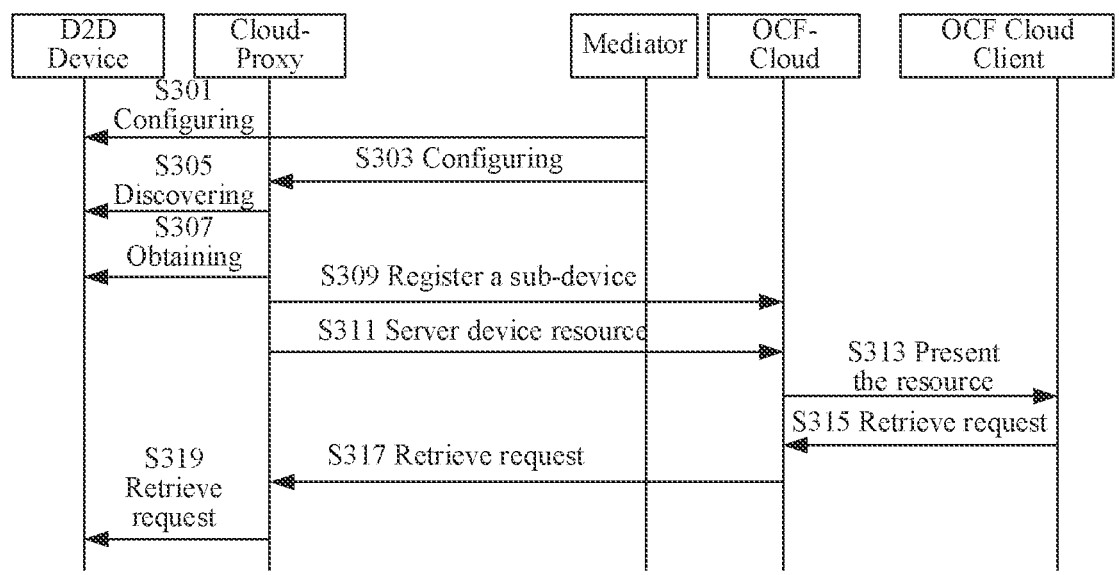
FIG. 3 is a flowchart of a method for publishing a resource in the related art.

FIG. 3 is a flowchart of a method for publishing a resource in the related art. As shown in FIG. 3, the method includes the following operations.

At S301, a mediator configures (onboards) an OCF server device (D2D device).

The mediator may send configuration information to the OCF server device to configure the OCF server device.

At S303, the mediator configures the OCF gateway (cloud-proxy).

The mediator may send configuration information to the OCF gateway to configure the OCF gateway.

At S305, the OCF gateway (cloud-proxy) discovers the OCF server device (D2D device) in the network.

At S307, the OCF gateway is connected to the server device to obtain the resource of the server device.

The gateway sends a retrieve request to the server device to obtain a resource to be published of the server device.

At S309, the OCF gateway registers a sub-device (sub_di) on the OCF-cloud.

Operation S309 may be implemented in the following manner: the OCF gateway may send an update request to an account resource of the cloud platform, the update request includes the sub_di attribute, and attribute information or an attribute value of the sub_di attribute is a device identifier (d2d_di) of the server device.

In an implementation of the present disclosure, the identifier may refer to an ID or a Uniform Resource Identifier (URI). For example, the identifier of the server may be a server ID, the identifier of the gateway may be a gateway ID, or the like.

At S311, the OCF gateway publishes the obtained server device resource to the cloud RD.

The OCF gateway sends an update request to a resource directory resource of the cloud platform. The update request includes a payload attribute, and attribute information or an attribute value of the payload attribute is a resource link of the server device.

In some implementations, the server device resources may be resources such as the temperature, light, and operable state of the server.

At S313, the cloud RD presents the resource to a corresponding cloud client (Off cloud client).

In the embodiment of the present disclosure, the cloud RD presents the resource to the corresponding cloud client may be understood as the cloud RD publishing the resource.

The URI of the context corresponding to the resource presented by the cloud RD is <d2d_di>, and the attribute information of the Hypertext Reference (href) attribute corresponding to the resource presented by the cloud RD is <d2d_di> and <d2d_href>.

At S315, the client sends a retrieve request to the cloud, and the retrieve request is used to request to obtain the resource status of the server device.

The client may send a retrieve request to the cloud, the retrieve request includes <d2d_di> and <d2d_href>.

At S317, the cloud forwards the retrieve request to the OCF gateway.

After receiving the retrieve request, the cloud sends the retrieve request including the <d2d_di> and the <d2d_href> to the gateway if it is determined to forward the retrieve request to the gateway. In other embodiments, if the cloud sends the retrieve request directly to the server device, the retrieve request including the <d2d_href> is sent to the server device.

At S319, the OCF gateway forwards the retrieve request to the server device.

The gateway sends a retrieve request including the <d2d_href> to the server device.

After receiving the retrieve request, the server device sends an acquisition response to the gateway, the response includes the status information of the server device. The gateway forwards the acquisition response to the cloud platform, and the cloud platform forwards the acquisition response to the client.

However, the current cloud platform does not need to send the <d2d_di> when forwarding the retrieve request to the gateway. However, in the resource publishing method of the related art, the request forwarding policy of the current cloud platform needs to be modified, that is, the <d2d_di> is reserved, resulting in logical redundancy in cloud processing.

Figure 4:
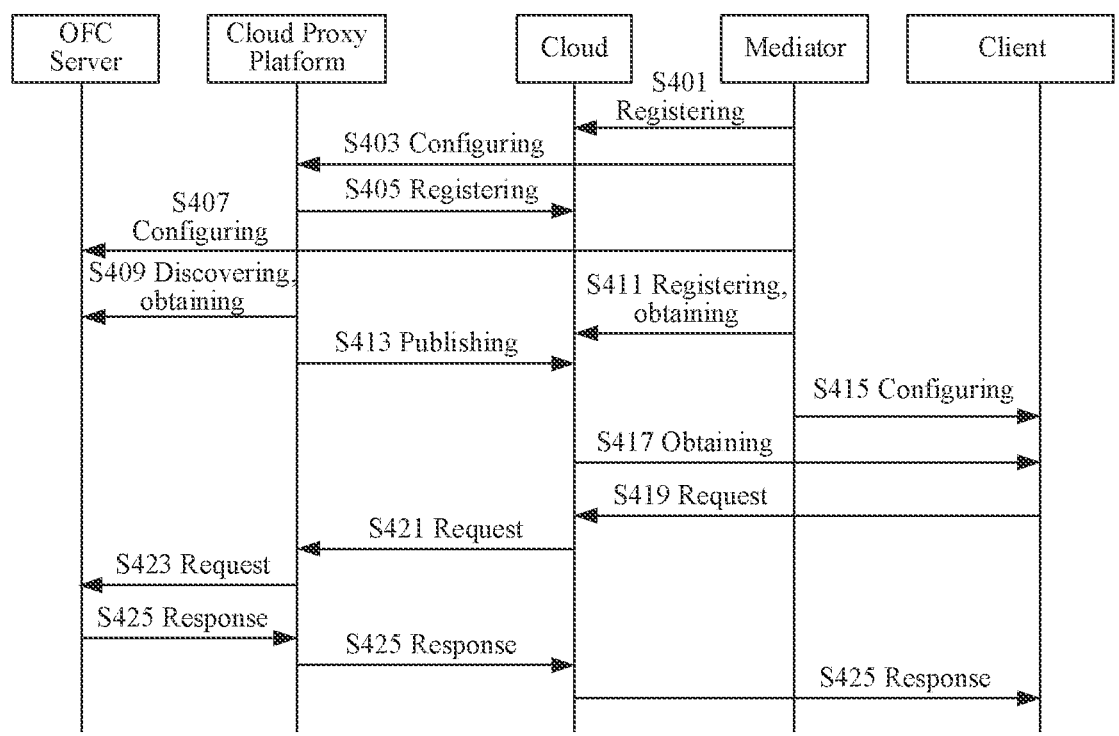
FIG. 4 is a flowchart of another method for publishing a resource in the related art.

FIG. 4 is a flowchart of another method for publishing a resource in the related art. As shown in FIG. 4, the method may include the following operations.

At S401, a mediator is registered to a cloud.

Before performing the operation S401, the operation of registering the user to the cloud may also be performed, for example, the user on the mediator side may register to the cloud through the mediator.

At S403, the mediator configures the OCF gateway (cloud proxy platform).

At S405, the OCF gateway registers to the cloud.

At S407, the mediator configures the OCF server device (OCF server).

At S409, the OCF gateway discovers the OCF server device in the network, the OCF gateway connects to the OCF server device to obtain the resource of the OCF server device, and the OCF server device registers to the OCF gateway.

At S411 the mediator registers the OCF server device on the cloud, and obtains an access token of the OCF server device.

At S413, the OCF gateway publishes the obtained server device resource to the cloud RD.

At S415, the mediator configures a client to register to the cloud.

At S417, the client obtains the resource published on the cloud.

At S419, the client requests the cloud to obtain the resource status of the server device.

At S421, the cloud forwards the request to the OCF gateway to obtain the resource status of the server device.

At S423, the OCF gateway forwards the request to the server device to obtain the resource status.

At S425, the server device returns a response to the OCF gateway, the OCF gateway returns a response to the cloud platform, and the cloud platform returns a response to the client.

The processing flow of the method for publishing the resource of the solution requires multiple interventions of the mediator, thereby increasing the complexity of the user operation.

Figure 5:
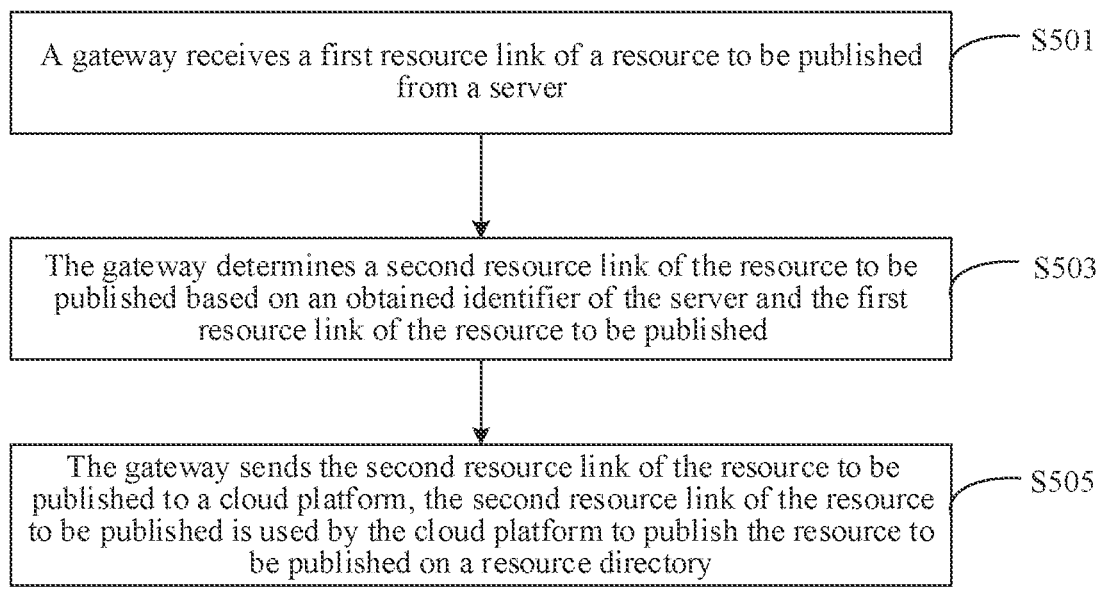
FIG. 5 is a flowchart of a method for publishing a resource according to an embodiment of the present disclosure.

FIG. 5 is a flowchart of a method for publishing a resource according to an embodiment of the present disclosure. As shown in FIG. 5, the method includes the following operations.

At S501, a gateway receives a first resource link of a resource to be published from a server.

The resource to be published may be one resource in the server. The server may include one or more resources. For example, the server may include a resource for obtaining a temperature, a resource for obtaining light, a resource for obtaining an open or closed state of a door, and the like.

The resource link in the embodiment of the present disclosure may also be described as a resource reference, a resource link or resource link information.

In one implementation, after discovering the server, the gateway may send acquisition information for obtaining the device resource to the server. Then, the server sends a response to the gateway, the response including a first resource link. In one implementation, the response may include a /oic/res resource, where the /oic/res resource may include a first resource link.

Taking the resource as light as an example, the first resource link may include:

```
{
    "anchor": "ocf://550E8400-E29B-41D4-A716-446655440000",
    "href": "/light",
    "rt": ["oic.r.swtch.binary"],
    "if": ["oic.if.a", "oic.if.baseline"]
}
```

Where "anchor" is an anchor and represents the URI of the context. The first resource link includes an anchor attribute, a href attribute, an rt attribute, and an if attribute. An attribute value or attribute information of the anchor attribute is <deviceID>, where the deviceID indicates a host device of the target resource. In the first resource link, the deviceID is an ID of the server. For example, the ID of the server may be 550E8400-E29B-41D4-A716-446655440000. The attribute value or attribute information of the href attribute is the target URI, that is, the target resource referenced by the link. In the embodiment of the present disclosure, the target URI is the URI of the resource to be published. For example, the URI of the light may be /light. The attribute value or attribute information of the rt attribute is a resource type identifier of the target resource, and the attribute is mandatory. The attribute value or attribute information of the if attribute is an interface set supported by the target resource, and the attribute is mandatory.

In some implementations, the gateway may receive resource links of resources to be published from a plurality of servers, thereby uploading the resource links of the resources to be published from the plurality of servers to the cloud platform.

At S503, the gateway determines a second resource link of the resource to be published based on an obtained identifier of the server and the first resource link of the resource to be published.

After obtaining the first resource link, the gateway may obtain the identifier of the server. In one implementation, the gateway may obtain the identifier of the server (ID of the server) from the first resource link. In another implementation, the gateway may obtain the identifier of the server in other manners. For example, when the gateway is connected to the server, the gateway may obtain the identifier of the server. The manner of how to obtain the identifier of the server is not limited in the embodiments of the present disclosure.

In some implementations, the gateway may add the identifier of the server into the first resource link to obtain a second resource link. In other embodiments, the gateway may bind the identifier of the server and the first resource link together to obtain a second resource link. In the embodiments of the present disclosure, the manner of obtaining the second resource link is not limited as long as the second resource link is determined based on the first resource link and the identifier of the server.

In the implementation of the present disclosure, the anchor of the first resource link is the identifier of the server, and the anchor of the second resource link is the identifier of the gateway. In some implementations, after obtaining the first resource link, the gateway may modify the anchor in the first resource link to an identifier of the gateway to obtain the second resource link.

At S505, the gateway sends the second resource link of the resource to be published to a cloud platform. The second resource link of the resource to be published is used by the cloud platform to publish the resource to be published on a resource directory.

In some implementations, publishing the resource to be published on the resource directory by the cloud platform may be understood as presenting the resource to be published on the resource directory by the cloud platform.

The anchor of the resource link corresponding to the resource to be published presented on the resource directory is the identifier of the gateway.

In the embodiments of the present disclosure, the gateway receives the first resource link of the resource to be published from the server, and sends the second resource link of the resource to be published to the cloud platform, so that the resource link of the resource to be published of the server is forwarded through the gateway, and the gateway can publish the resource instead of the server, so as to ensure that the resource link can be uploaded to the cloud unobstructed, so that the resource of the server can be published in a reasonable way.

Figure 6:
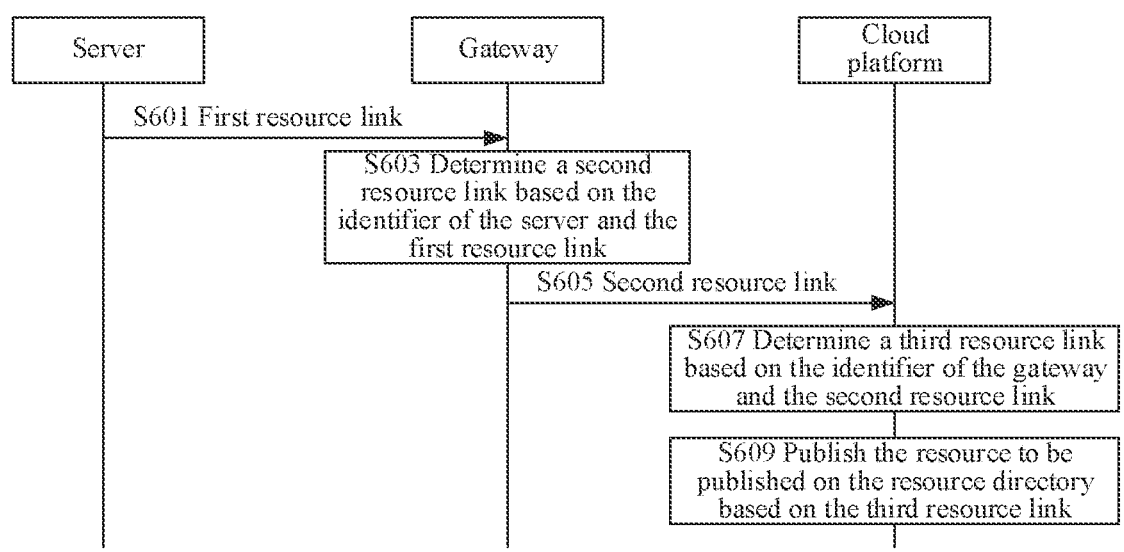
FIG. 6 is a flowchart of another method for publishing a resource according to an embodiment of the present disclosure.

FIG. 6 is a flowchart of another method for publishing a resource according to an embodiment of the present disclosure. As shown in FIG. 6, the method includes the following operations.

At S601, the gateway receives the first resource link of the resource to be published from the server.

At S603, the gateway determines a second resource link of the resource to be published based on the obtained identifier of the server and the first resource link of the resource to be published.

At S605, the gateway sends the second resource link of the resource to be published to the cloud platform. The cloud platform receives the second resource link of the resource to be published from the gateway.

At S607, the cloud platform determines a third resource link of the resource to be published based on the obtained identifier of the gateway and the second resource link of the resource to be published.

After receiving the second resource link of the resource to be published, the cloud platform may obtain the identifier of the gateway. In one implementation, the gateway may obtain the identifier of the gateway (ID of the gateway) from the second resource link. In another implementation, the gateway may be connected to the cloud platform, and the cloud platform may obtain an identifier of the gateway. In yet another implementation, the gateway may obtain an identifier of the gateway based on the gateway registration and/or login to the cloud platform. The embodiments of the present disclosure do not limit the manner in which the cloud platform obtains the identifier of the gateway.

In some implementations, the cloud platform may add the identifier of the gateway into the second resource link to obtain a third resource link. In other implementations, the cloud platform may bind the identifier of the gateway and the second resource link together to obtain the third resource link. In the embodiments of the present disclosure, the manner of obtaining the third resource link is not limited as long as the third resource link is determined based on the second resource link and the identifier of the gateway.

At S609, the cloud platform publishes the resource to be published on the resource directory based on the third resource link of the resource to be published.

The resource directory may be a cloud resource directory (cloud RD). In some implementations, the operation of publishing the resource to be published on the resource directory by the cloud platform may include that the cloud platform publishes the third resource link of the resource to be published on the resource directory.

The third resource link is published on the resource directory by the cloud platform, so that the cloud platform publishes the resources it carries in the resource directory of the cloud, so as to facilitate remote access to these resources.

In the embodiments of the present disclosure, since the gateway determines the second resource link of the resource to be published based on the identifier of the server and the first resource link of the resource to be published, and the cloud platform determines the third resource link of the resource to be published based on the identifier of the gateway and the second resource link of the resource to be published, an implementation of uploading the resource of the server to the cloud platform through the gateway is provided, so that the resource to be published can be easily uploaded to the cloud through the implementation.

Figure 7:
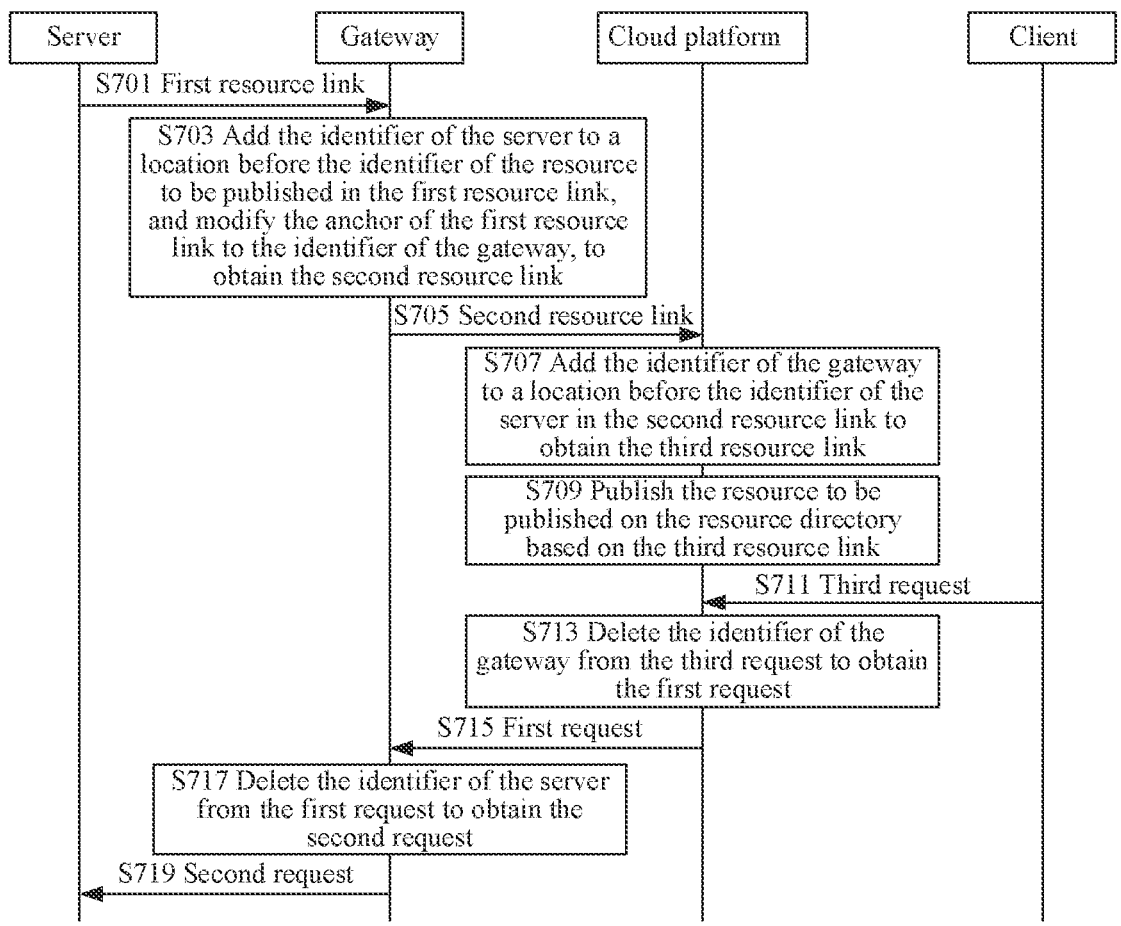
FIG. 7 is a flowchart of yet another method for publishing a resource according to an embodiment of the present disclosure.

Referring to FIG. 7, FIG. 7 is a flowchart of yet another method for publishing a resource according to an embodiment of the present disclosure. As shown in FIG. 7, the method includes the following operations.

At S701, the gateway receives the first resource link of the resource to be published from the server.

The first resource link of the resource to be published may include the identifier of the resource to be published.

At S703, the gateway adds the identifier of the server to a location before the identifier of the resource to be published in the first resource link of the resource to be published, and modifies the anchor of the first resource link to the identifier of the gateway, to obtain the second resource link.

The second resource link may include the identifier of the resource to be published and the identifier of the server in the location before the identifier of the resource to be published.

In the process of implementation, the identifier of the server is added to the location before the identifier of the resource to be published in the first resource link of the resource to be published. In another description mode, the attribute information or the attribute value of the href attribute in the first resource link of the resource to be published is modified from the identifier of the resource to be published (/path) to the sequence of the identifier of the server (/ServerID) and the identifier of the resource to be published (/path), thereby obtaining (/ServerID/path).

Taking the resource as light as an example, the second resource link may include:

```
{
  "anchor": "ocf:// 88B7C7F0-4B51-4E0A-9FAA-CfB439FD7F49",
  "href": "/550E8400-E29B-41D4-A716-446655440000/light",
  "rt": ["oic.r.swtch.binary"],
  "if: ["oic.if.a", "oic.if.baseline"]
}
```

The difference between the second resource link and the first resource link is that the attribute value or attribute information of the href attribute of the first resource link is /light, the attribute value or attribute information of the href attribute of the second resource link is /ServerID/light, the anchor of the first resource link is ServerID, and the anchor of the second resource link is GatewayID. Where /550E8400-E29B-41D4-A716-446655440000 is the identifier of the server (ServerID), and 88B7C7F0-4B51-4E0A-9FAA-CfB439FD7F49 is the identifier of the gateway (GatewayID).

At S705, the gateway sends the second resource link of the resource to be published to the cloud platform. The cloud platform receives the second resource link of the resource to be published from the gateway.

At S707, the cloud platform adds the identifier of the gateway to a location before the identifier of the server in the second resource link of the resource to be published to obtain the third resource link of the resource to be published.

The third resource link may include the identifier of the resource to be published, the identifier of the server in the location before the identifier of the resource to be published, and the identifier of the gateway in the location before the identifier of the server.

In the process of implementation, the identifier of the gateway is added to the location before the identifier of the server in the second resource link of the resource to be published. In another description mode, the attribute information or the attribute value of the href attribute in the second resource link of the resource to be published is modified from the sequence (/ServerID/path) of the identifier of the server (/ServerID) and the identifier of the resource to be published (/path) to the sequence (/GatewayID/ServerID/path) of the identifier of the gateway (/GatewayID), the identifier of the server (/ServerID) and the identifier of the resource to be published (/path).

Taking the resource as light as an example, the third resource link may include:

```
{
  "anchor": "ocf://88B7C7F0-4B51-4E0A-9FAA-CfB439FD7F49",
  "href": "/88B7C7F0-4B51-4E0A-9FAA-CfB439FD7F49/550E8400-E29B-41D4-A716-446655440000/light",
  "rt": ["oic.r.swtch.binary"],
  "if": ["oic.if.a", "oic.if.baseline"]
}
```

At S709, the cloud platform publishes the resource to be published on the resource directory based on the third resource link of the resource to be published.

By the operation S709, the resource to be published is published on the RD of the cloud platform, so that the client can obtain the resource to be published from the RD of the cloud platform. In addition, the client may obtain the status information of the resource to be published using the cloud platform.

At S711, the cloud platform receives the third request from the client. The third request includes the identifier of the resource to be published, the identifier of the server in the location before the identifier of the resource to be published, and the identifier of the gateway in the location before the identifier of the server.

At S713, the cloud platform deletes the identifier of the gateway from the third request to obtain the first request.

At S715, the cloud platform sends a first request to the gateway. The gateway receives the first request from the cloud platform.

The first request includes an identifier of the resource to be published and the identifier of the server in the location before the identifier of the resource to be published.

At S717, the gateway deletes the identifier of the server from the first request to obtain the second request.

At S719, a second request is sent to the server.

In some embodiments, the first request, the second request, or the third request may be a retrieve request that instructs the client to obtain the status of the resource to be published. For example, the retrieve request is used to obtain light information of the server. In other embodiments, the first request, the second request, or the third request may be an update request that indicates to update the status of the resource to be published. For example, the update request here is used to update the light of the server to a specific light.

After receiving the second request, the server may send a response to the gateway. In some embodiments, the response may include or indicate the status of the resource to be published. In other embodiments, the response may include or indicate that the status update for the resource to be published is complete. Then, the gateway forwards the response to the cloud platform, and the cloud platform forwards the response to the client, so that the client obtains the status of the resource to be published.

In the embodiment of the present disclosure, the gateway determines the second resource link of the resource to be published based on the identifier of the server and the first resource link of the resource to be published, and the cloud platform determines the third resource link of the resource to be published based on the identifier of the gateway and the second resource link of the resource to be published, so that the resource to be published can be easily uploaded to the cloud, and in addition, the request generated by the client can be easily sent to the server.

Figure 8:
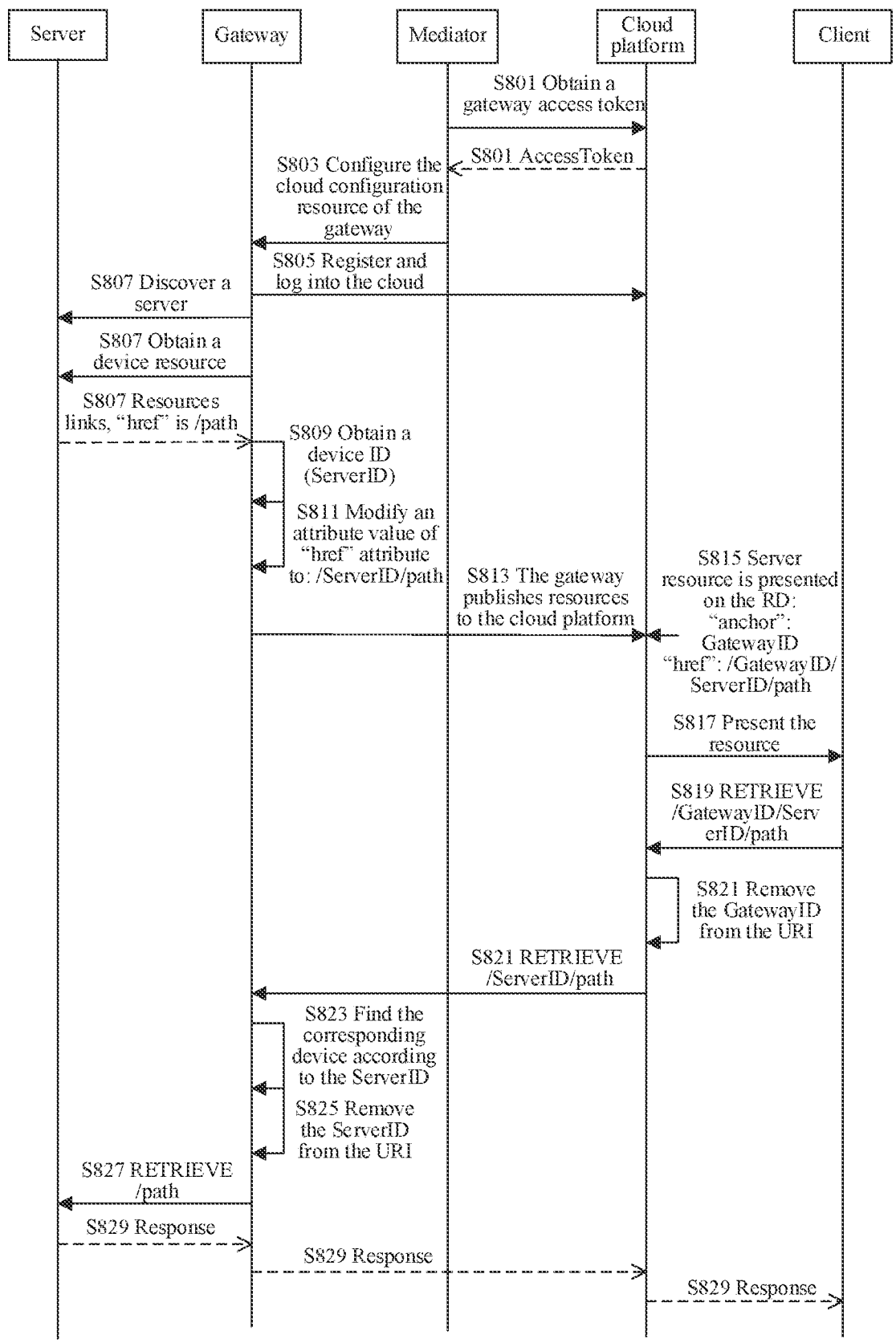
FIG. 8 is a flowchart of still another method for publishing a resource according to an embodiment of the present disclosure.

Referring to FIG. 8, FIG. 8 is a flowchart of still another method for publishing a resource according to an embodiment of the present disclosure. As shown in FIG. 8, the method includes the following operations.

At S801, the mediator obtains a gateway access token from the cloud platform.

Before the operation S801, at least one of the user registration to the cloud platform, the mediator registration and logging into the cloud platform, the client registration and logging into the cloud platform may also be performed. The user may configure the security policies of the gateway and the server so that the local security connection may be established. By registering to the cloud platform, the user may be enabled to configure the device in the resource publishing system. For example, the user may configure the resource access permission, and the like.

In some implementations, the mediator may send a request to the cloud for the user to obtain the access token, the cloud platform receives the request and sends the access token of the gateway (the gateway access token) to the mediator.

At S803, the mediator configures the cloud configuration resource of the gateway.

The cloud configuration resource may be a CoAPCloud-Conf (CCC) resource that provides configuration information for the device to connect to the cloud. When configuring the cloud configuration resource of the gateway, the mediator may first obtain attribute information of the cloud configuration resource. The attribute information of the cloud configuration resource includes the access token of the gateway, a cloud URI, and a cloud ID. The mediator may configure the cloud configuration resource of the gateway based on the attribute information of the cloud configuration resource.

At S805, the gateway registers and logs into the cloud platform.

The gateway may register and log into the cloud platform based on the attribute information of the CCC resource.

At S807, the gateway discovers a server (D2D Server) and obtains a /oic/res resource of the server. The /oic/res resource includes a resource link, and the attribute value of the "href" attribute in the resource link is /path.

The gateway discovers the server, which may be implemented in the case that the server accesses the network. The gateway obtains the /oic/res resource of the server may include: the gateway sends the resource request to the server, the server responds to the resource request and sends the /oic/res resource to the gateway.

The /oic/res resource includes the first resource link of the resource to be published. The attribute value of the anchor attribute in the first resource link of the resource to be published is the identifier of the server, and the attribute value of the href attribute (or referred to as the target URL of the link) in the first resource link of the resource to be published is the identifier of the resource to be published (e.g., /path).

At S809, after receiving a resource responded by the server device, the gateway further obtains the ID of the server.

At S811, the gateway modifies the attribute value of the href attribute of the first resource link of the resource to be published to the identifier of the resource to be published and the identifier of the server in a location before the identifier of the resource to be published (e.g., /ServerID/path).

Further, the gateway may also modify the attribute value or attribute information of the anchor attribute of the first resource link to the identifier of the gateway.

Where ServerID is the ID of the server obtained by the gateway. /path is the attribute value of the "href" attribute of the first resource link.

After modifying the attribute value of the href attribute of the first resource link of the resource to be published, the second resource link of the resource to be published is obtained.

At S813, the gateway publishes resources to the cloud platform.

In some implementations, the gateway publishes the modified resource link to the cloud platform RD.

At S815, the cloud platform RD presents the published resource, the anchor of the published resource link is the identifier of the gateway (Gateway ID), and the attribute value of the href attribute of the published resource link is /GatewayID/ServerID/path.

At S817, the client of the user discovers the published resource in the cloud and presents the resource to the user.

At S819, the user initiates a RETRIEVE request to query the resource status of the server through the client. The RETRIEVE request here includes /Gateway/ID/ServerID/path.

In one implementation, the RETRIEVE request may include the attribute information or the attribute value of the href attribute of the third resource link of the resource to be published. For example, the RETRIEVE request may include /GatewayID/ServerID/path.

At S821, after receiving the RETRIEVE request, the cloud platform first removes the identifier of the gateway (/GatewayID) from the URI in the RETRIEVE request, finds the gateway corresponding to the GatewayID, and forwards the request to the gateway.

The RETRIEVE request forwarded by the cloud platform to the gateway may include the attribute information or the attribute value of the href attribute of the second resource link of the resource to be published. For example, the RETRIEVE request may include /ServerIDpath.

At S823, after receiving the RETRIEVE request, the gateway parses out the ServerID and finds the corresponding server based on the ServerID. The RETRIEVE request in the operation includes /ServerID/path.

At S825, the gateway removes the ServerID from the URI of the RETRIEVE request.

At S827, the gateway forwards the RETRIEVE request to the server The RETRIEVE request in the operation includes /path.

The RETRIEVE request in operation S827 may include the attribute information or the attribute value of the href attribute of the first resource link of the resource to be published. For example, the RETRIEVE request may include /path.

At S829, after receiving the RETRIEVE request, the server returns a response carrying the resource status.

The server may send the response carrying the resource status to the gateway, the gateway may send the response carrying the resource status to the cloud platform, and the cloud platform may send the response carrying the resource status to the client of the user, so that the user can see the resource status of the resource to be published on the client.

In the embodiment of the present disclosure, after the server accesses the gateway, the gateway sends the resource address corresponding to the server to the cloud platform, and the cloud platform uploads the resource, so that the resource can be easily published to the cloud platform through the gateway, and the remote access link can be ensured to be unobstructed.

Figure 9:
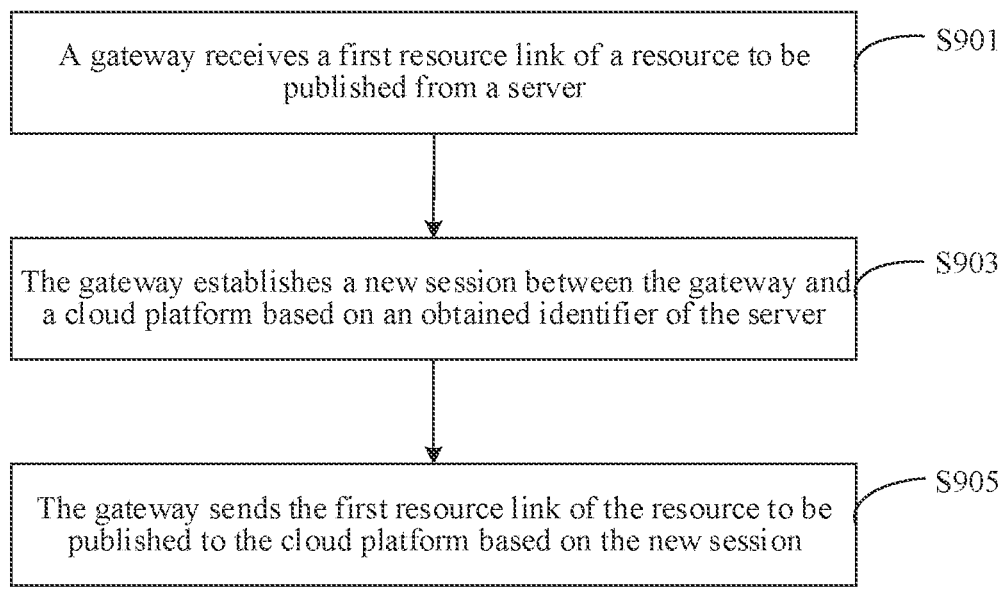
FIG. 9 is a flowchart of a method for publishing a resource according to another embodiment of the present disclosure.

FIG. 9 is a flowchart of a method for publishing a resource according to another embodiment of the present disclosure. As shown in FIG. 9, the method includes the following operations.

At S901, a gateway receives a first resource link of a resource to be published from a server.

At S903, the gateway establishes a new session between the gateway and a cloud platform based on an obtained identifier of the server.

The new session in the embodiment of the present disclosure may be an application layer session through which information may be transmitted between the gateway and the cloud platform.

In some implementations, the gateway may register and log into the cloud platform based on the identifier of the server to establish or initiate a new session.

At S905, the gateway sends the first resource link of the resource to be published to the cloud platform based on the new session.

In one implementation, the gateway may save a new session in a manner that the new session corresponds to the identifier of the server, so that the session corresponding to the server may be determined based on the identifier of the server. When receiving identifiers of multiple servers, the gateway can determine a different session corresponding to each of the identifiers of the multiple servers based on the identifiers of the multiple servers, so that the first resource link of the resource to be published from each of the multiple servers is sent to the cloud platform through the respective one of the multiple sessions corresponding to the identifiers of the multiple servers one by one.

In the embodiment of the disclosure, a session is established between the gateway and the cloud platform. As a result, data can be exchanged between the gateway and the cloud platform, so that the resource to be published can be uploaded to the cloud platform without performing complex operations. For example, there is no need to perform complex sub-device registration operations as in the related art, or complex configuration by a mediator.

Figure 10:
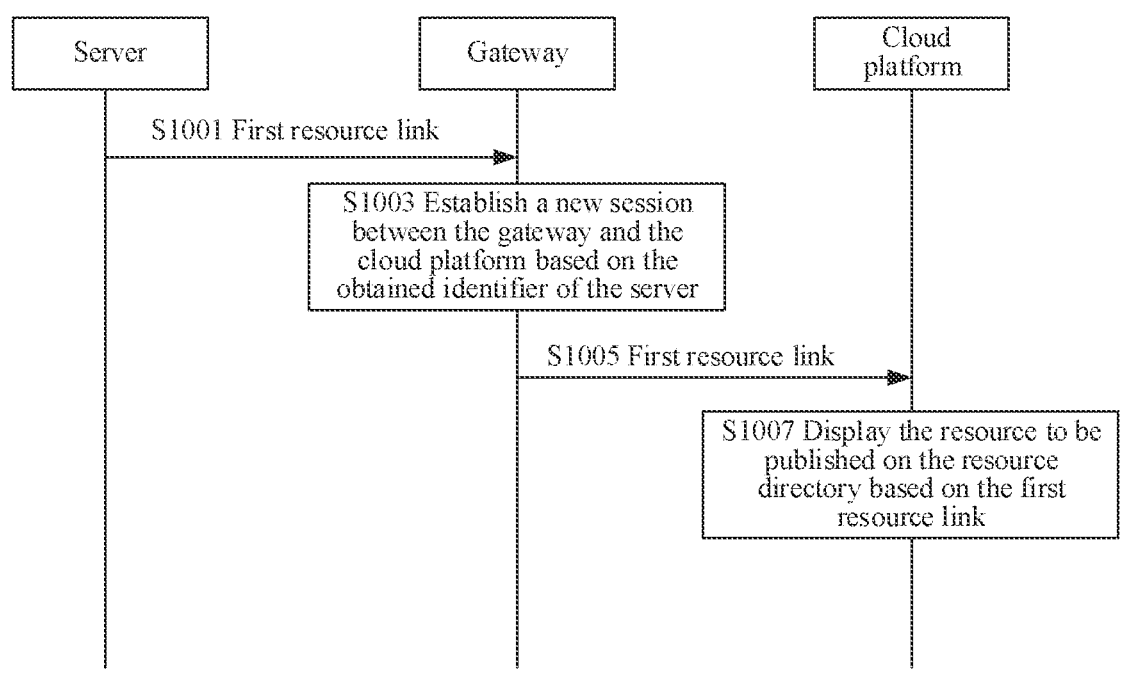
FIG. 10 is a flowchart of a method for publishing a resource according to yet another embodiment of the present disclosure.

FIG. 10 is a flowchart of a method for publishing a resource according to yet another embodiment of the present disclosure. As shown in FIG. 10, the method includes the following operations.

At S1001, the gateway receives the first resource link of the resource to be published from the server.

The attribute value of the anchor attribute of the first resource link of the resource to be published is the identifier of the server, and the attribute value of the href attribute of the first resource link of the resource to be published is the identifier of the resource to be published.

In one embodiment, the contents of the first resource link of the resource to be published may include:

```
{
    "anchor": "ocf://550E8400-E29B-41D4-A716-446655440000",
    "href": "/light",
    "rt": ["oic.r.swtch.binary"],
    "if": ["oic.if.a", "oic.if.baseline"]
}
```

At S1003, the gateway establishes a new session between the gateway and the cloud platform based on the obtained identifier of the server.

In some implementations, the session may be established in the following manner. The gateway sends an UPDATE request to the session resource "/oic/sec/session" of the cloud platform. After successfully verifying the request, the cloud responds to the update operation, the new session is established, and data may be exchanged between the gateway and the cloud platform.

At S1005, the gateway sends the first resource link of the resource to be published to the cloud platform based on the new session, and the cloud platform receives the first resource link of the resource to be published from the gateway based on the new session between the gateway and the cloud platform.

After the new session is initiated or established, information may be exchanged between the gateway and the cloud platform.

At S1007, the cloud platform displays the resource to be published on the resource directory based on the first resource link of the resource to be published.

In the embodiment of the present disclosure, the gateway may receive the first resource link of the resource to be published from the server, and send the first resource link of the resource to be published to the cloud platform through the new session established based on the identifier of the server, thereby providing a manner in which the gateway may send the first resource link of the resource to be published to the cloud platform instead of the server, and ensuring the remote access link to be unobstructed.

Figure 11:
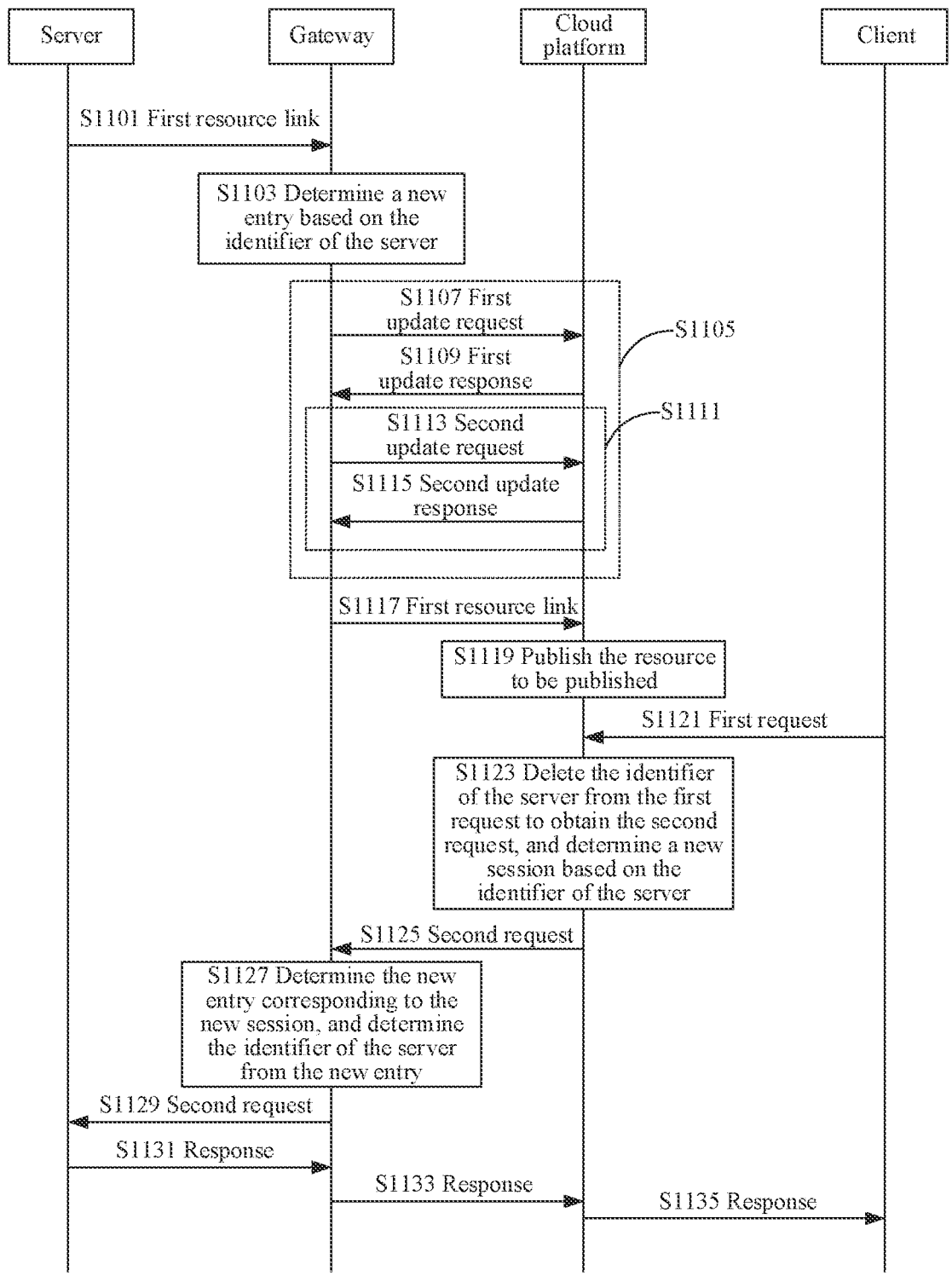
FIG. 11 is a flowchart of a method for publishing a resource according to still another embodiment of the present disclosure.

FIG. 11 is a flowchart of a method for publishing a resource according to still another embodiment of the present disclosure. As shown in FIG. 11, the method includes the following operations.

At S1101, the gateway receives the first resource link of the resource to be published from the server.

At S1103, the gateway determines a new entry based on the identifier of the server. The new entry may include at least the identifier of the server and the identifier of the cloud configuration resource. In some implementations, the new entry may further include an identifier of the resource directory client.

The cloud configuration resource and/or the resource directory client may be a running instance on the gateway.

In some implementations, the gateway determines the new entry based on the identifier of the server may include: when the server is determined to be a newly accessed device based on the identifier of the server, the identifier of the resource directory client corresponding to the identifier of the server and the identifier of the cloud configuration resource corresponding to the identifier of the server are generated.

In some implementations, the entry may be an Entry, and the data structure of the Entry may be <ServerID, RDC, CCC=>, that is, Entry: <ServerID, RDC, CCC>.

The ServerID in the Entry is the identifier of the server. The RDC in the Entry may be a handle of the RD client, or the RDC in the Entry may be an internal identifier of an instance of the RD client running on the gateway. For example, in some implementations, the value of the RDC may be 11111111. The CCC in the Entry may be a URI of the CoapCloudConf resource, or the CCC in the Entry may be an identifier of the running instance of the cloud configuration resource CoapCloudConf. For example, in some implementations, the value of CCC may be /light1/CoapCloudConf.

In some implementations, after determining the new entry based on the identifier of the server, the gateway may also perform the following operations. A first server list including at least one entry is obtained. Each of the at least one entry corresponds to a different server identifier. A new entry is added to the first server list to obtain a second server list, and the second server list is saved.

The first server list may be stored within the gateway, and the gateway may maintain and/or update the first server list. Each entry in the first server list may include a respective identifier of the server, a respective identifier of the resource directory client, and a respective identifier of the cloud configuration resource. In other embodiments of the present disclosure, each entry in the first server list may include one or two of: the respective identifier of the server, the respective identifier of the resource directory client, or the respective identifier of the cloud configuration resource.

Through the first server list, the gateway may correspond each entry in the first server list to a respective server, and each entry corresponds to a respective session, so that the gateway may send first resource links of the resources to be published from different servers to the cloud platform through different sessions, so that the cloud platform may determine, through the session, the server or the identifier of the server corresponding to the first resource link of the resource to be published.

The data structure of the new entry may be the same as that of each entry in the first server list. The second server list is obtained by adding the new entry to the first server list. The embodiments of the present disclosure do not limit how the new entry is added to the first server list. For example, the new entry may be added at the beginning, end, or middle of the first server list.

The gateway may also update the second server list. For example, one or at least two entries in the second server list may be deleted, or one or at least two entries may be added into the second server list, to obtain a third server list, or the like. That is, the server list stored in the gateway can be continuously updated.

The gateway may configure the cloud configuration resource in the following manner. The gateway sends a notification message to a mediator. The notification message includes the identifier of the server and the identifier of the cloud configuration resource. The identifier of the server is used by the mediator to determine the attribute information of the cloud configuration resource. The attribute information of the cloud configuration resource is used by the mediator to configure a cloud configuration resource corresponding to the identifier of the cloud configuration resource in the gateway.

The attribute information of the cloud configuration resource may include an access token of the server, a cloud access URI, a cloud Universally Unique Identifier (UUID), an authorization provider name, and the like.

After receiving the notification message from the gateway, the mediator may obtain the attribute information of the cloud configuration resource in the following manner. The mediator sends a request for obtaining the access token of the server to the cloud platform. The cloud platform returns the access token of the server to the mediator. The mediator determines the attribute information of the cloud configuration resource based on the access token of the server. The mediator may determine the cloud configuration resource corresponding to the identifier of the cloud configuration resource in the gateway based on the identifier of the cloud configuration resource. The mediator sends the attribute information of the cloud configuration resource to the cloud configuration resource.

In some implementations, the mediator sends the attribute information of the cloud configuration resource to the cloud configuration resource may include: the mediator sends an UPDATE request to the cloud configuration resource, where the request includes information such as a access token of the server, a cloud access URI, a cloud UUID, and an authorization provider name.

At S1105, the gateway establishes a new session between the gateway and the cloud platform based on the identifier of the server and the attribute information of the cloud configuration resource. The new session corresponds to the new entry, and the attribute information of the cloud configuration resource corresponds to the identifier of the cloud configuration resource.

In some implementations, the gateway establishes the new session between the gateway and the cloud platform based on the identifier of the server and the attribute information of the cloud configuration resource, which may be implemented by the operations of S1107, S1109, and S1111 below, or may be implemented by the operations of S1107, S1109, S1113, and S1115 below.

At S1107, the gateway sends a first update request to the cloud platform. The cloud platform receives the first update request from the gateway.

The first update request includes the identifier of the server and attribute information of the cloud configuration resource. The attribute information of the cloud configuration resource includes the access token. The attribute information of the cloud configuration resource may further include a cloud access URI and a cloud UUID.

The access token may be obtained in the following manner. After receiving the notification message, the mediator sends a token retrieve request for requesting the access token of the server to the cloud platform. The cloud platform receives the token retrieve request of the server from the mediator. The cloud platform sends a response to the token retrieve request to the mediator. The response includes the access token of the server. The access token is used by the gateway to establish the new session between the gateway and the cloud platform.

At S1109, the cloud platform sends a first update response to the gateway. The gateway receives a first update response from the cloud platform.

The first update response includes a user identifier and a new token. The user identifier and the new token instruct the gateway to send a second update request to the cloud platform to establish the new session between the gateway and the cloud platform.

In some implementations, operations S1107 and S1109 may be a process of registering the gateway to the cloud platform.

In some implementations, the gateway may send a first UPDATE request to the account resource "/oic/sec/account" of the cloud platform. The UPDATE request may include some or all of the resource attributes of the cloud configuration resource configured in the resource "oic.r.coapcloudconf", and may also include the identifier of the server. The account resource of the cloud platform may respond to the first UPDATE request and feed back a first update response to the gateway. The feedback first update response may include a user identifier and a new token. In some implementations, the feedback first update response may further include an expiration time of the new token, and the like.

The first update request may include:
UPDATE /oic/sec/account

```
{
    "di" : "550E8400-E29B-41D4-A716-446655440000",
    "authprovider" : "github",
    "accesstoken" : "8802f2eaf8b5e147a936"
}
```

The attribute information or the attribute value of the di (deviceID) attribute in the first update request is an identifier or an ID of the server. The accesstoken in the first update request may be an access token.

The new token and the access token in the embodiment of the present disclosure may be different tokens or the same token.

At S1111, the gateway establishes a new session between the gateway and the cloud platform based on the user identifier and the new token.

The gateway may save the user identifier and the new token and associate the user identifier and the new token with the new entry.

The gateway establishes the new session between the gateway and the cloud platform based on the user identifier and the new token, which may be implemented by the following operations S1113 to S1115.

At S1113, the gateway sends a second update request to the cloud platform. The cloud platform receives the second update request from the gateway.

The second update request includes the identifier of the server, the user identifier, and the new token.

At S1115, the cloud platform sends a second update response to the gateway. The gateway receives the second update response from the cloud platform.

The second update response indicates that the new session is successfully established.

In some implementations, operations S1113 to S1115 may be a process for the gateway to log into the cloud platform.

In some implementations, the gateway may send a second UPDATE request to the session resource "/oic/sec/session" of the cloud platform. The session resource of the cloud platform sends a second update response to the gateway.

The second update request may include:
UPDATE /oic/sec/session

```
{
    "di" : "550E8400-E29B-41D4-A716-446655440000",
    "uid" : "123e4567-e89b-12d3-a456-d6e313b71d9f",
    "accesstoken" : "8802f2eaf8b5e147a936",
    "login" : true
}
```

The attribute information or the attribute value of the di attribute in the second update request is the identifier of the server or the ID of the server. The accesstoken in the second update request is the access token. It should be understood that in other implementations, the accesstoken in the second update request is a new token different from the access token. The uid in the second update request is the user identifier.

At S1117, the gateway sends the first resource link of the resource to be published to the cloud platform based on the new session and the resource directory client corresponding to the identifier of the resource directory client. The cloud platform receives the first resource link of the resource to be published from the gateway based on the new session between the gateway and the cloud platform.

In some implementations, identifiers of different servers may correspond to identifiers of different resource directory clients, and identifiers of the servers may correspond to identifiers of resource directory clients one by one. In other embodiments, the identifier of one resource directory client may correspond to identities of at least two servers. For example, resource links of the resources to be published from at least two servers may be sent to the cloud platform through a running instance of one resource directory client.

In some implementations, resource links of at least two resources to be published from one server may be sent to the cloud platform through a running instance of one resource directory client. In other implementations, the resource links of at least two resources to be published from one server may be published through running instances of at least two resource directory clients corresponding to the resource links of the at least two resources to be published.

At S1119, the cloud platform publishes the resource to be published on the resource directory based on the first resource link of the resource to be published.

The cloud platform may present the resource to be published based on the first resource link of the resource to be published. In some implementations, the cloud platform may determine a fourth resource link of the resource to be published based on the first resource link of the resource to be published, and upload the fourth resource link of the resource to be published to the RD.

The anchor of the first resource link is the identifier of the server, and the href of the first resource link is the identifier of the resource to be published.

The anchor of the fourth resource link is the identifier of the server, and the href of the fourth resource link is the identifier of the resource to be published and the identifier of the server in a location before the identifier of the resource to be published.

For example, the fourth resource link may include:

```
{
    "anchor": "ocf://550E8400-E29B-41D4-A716-446655440000",
    "href": /550E8400-E29B-41D4-A716-446655440000/light",
    "rt": ["oic.r.swtch.binary"],
    "if": ["oic.if.a", "oic.if.baseline"]
}
```

At S1121, the cloud platform receives the first request from the client.

The first request includes the identifier of the resource to be published and the identifier of the server in the location before the identifier of the resource to be published.

The first request includes the identifier of the resource to be published and the identifier of the server in the location before the identifier of the resource to be published.

At S1123, the cloud platform deletes the identifier of the server from the first request to obtain the second request, and determines a new session based on the identifier of the server.

The cloud platform may store a correspondence between the new session and the identifier of the server, so that the cloud platform may determine the new session corresponding to the identifier of the server based on the identifier of the server.

At S1125, the cloud platform sends the second request to the gateway based on the new session. The gateway receives the second request from the cloud platform based on the new session.

The second request includes the identifier of the resource to be published.

At S1127, the gateway determines the new entry corresponding to the new session, and determines the identifier of the server from the new entry.

Since the gateway stores the correspondence between the new session and the new entry, the new entry can be determined based on the new session. In some implementations, the gateway may determine the new entry from a server list stored in the gateway according to the new session. In implementation, entries included in the server list stored herein include entries included in a second server list. For example, entries included in the server list stored herein may be the same as or different from entries included in the second server list.

At S1129, the gateway sends the second request to the server corresponding to the identifier of the server.

At S1131, the gateway receives a response from the server, the response includes a resource status of the resource to be published.

At S1133, the gateway forwards the response to the cloud platform.

At S1135, the cloud platform forwards the response to the client.

In some embodiments, the first request or the second request may be a retrieve request that indicates the client to obtain the status of the resource to be published. For example, the retrieve request is used to obtain the light information of the server. In other embodiments, the first request or the second request may be an update request that indicates to update the status of the resource to be published. For example, the update request here is used to update the light of the server to a specific light.

In the embodiment of the present disclosure, the gateway stores and maintains the server list, and each entry in the server list corresponds to a respective session, so that the gateway can determine a session uniquely corresponding to the server according to the identifier of the server, and upload the resource to be published instead of the server, so as to avoid the problem in the related art that the resource to be published is cumbersome to upload or the client obtains the status of the resource to be published is cumbersome.

Figure 12:
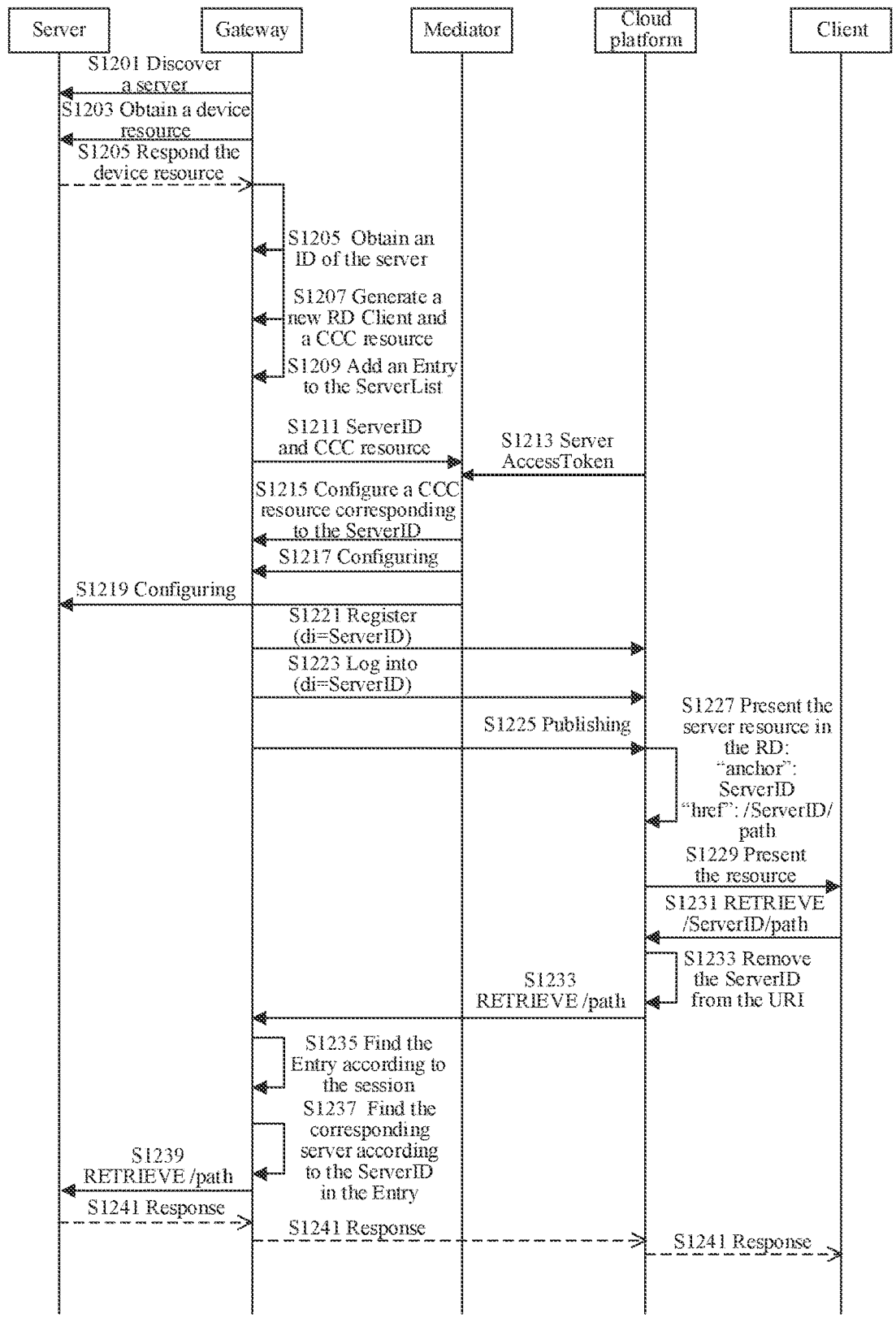
FIG. 12 is a flowchart of another method for publishing a resource according to another embodiment of the present disclosure.

FIG. 12 is a flowchart of another method for publishing a resource according to another embodiment of the present disclosure. As shown in FIG. 12, the method includes the following operations.

At S1201, the server accesses the network, and the gateway discovers the server (device).

At S1203, the gateway obtains a device resource.

In one implementation, the device resource may be /oic/res resource of the device.

An excerpt portion of the /oic/res resource is described herein, which includes link information of a resource (light):

```
{
    "anchor": "ocf://550E8400-E29B-41D4-A716-446655440000",
    "href": "/light",
    "rt": ["oic.r.swtch.binary"],
    "if": ["oic.if.a", "oic.if.baseline"]
}
```

The ID of the server is 550E8400-E29B-41D4-A716-446655440000.

At S1205, after receiving a resource responded by the device, the gateway further obtains an ID of the server.

The responded resource may be a resource link, and the "href" of the resource link is /path.

At S1207, the gateway determines that it is a newly accessed device, and generates a new RD Client and a CCC resource.

At S1209, the gateway adds an Entry: <ServerID, RDC, CCC> into the maintained ServerList.

Herein, <ServerID, RDC, CCC> is used to maintain the association between the server, the new RD Client, and the CCC resource. For example, RDC is the handle of the RD client with a value of 11111111. CCC is URI of CoapCloudConf resource with a value of /light1/CoapCloudConf. The device connects to the cloud according to the CoapCloudConf resource, and each server A has a corresponding CCC resource.

At S1211, the gateway notifies the mediator that a new device is discovered, and sends the ServerID and the URI of the CCC resource to the mediator.

At S1213, the mediator obtains the Server AccessToken from the cloud platform.

At S1215, the mediator configures a CCC resource corresponding to the ServerID with the obtained AccessToken.

At S1217, the mediator configures the gateway.

At S1219, the mediator configures the server.

Through the operations S1217 and S1219, the gateway is enabled to access the resource of the server.

At S1221, the gateway registers to the cloud platform with di=ServerID using the configured AccessToken.

The cloud platform returns the user ID and a new AccessToken, and the gateway saves them and associates them with the added Entry: <550E8400-E29B-41D4-A716-446655440000, 11111111, /light1/CoapCloudConf> in ServerList.

At S1223, after the registration is successful, the gateway logs into the cloud platform with di=ServerID to establish a new session.

The session is corresponding to the added Entry in the ServerList: <550E8400-E29B-41D4-A716-446655440000, 11111111, /light1/CoapCloudConf>.

At S1225, the RD Client (11111111) of the gateway publishes the obtained server resource link to the cloud RD.

At S1227, the server resource is presented in the RD of the cloud platform. The "anchor" of the resource link is ServerID, and the "href" of the resource link is /ServerID/path.

At S1229, the user client discovers the published resource on the cloud platform and presents the resource to the user.

At S1231, the user initiates a request (RETRIEVE request) through the client to query the resource status of the server. The request in the operation may include /ServerID/path.

For example, the request in the operation may include: RETRIEVE /550E8400-E29B-41D4-A716-446655440000/light.

At S1233, after receiving the request, the cloud platform first removes the/ServerID from the URI of the request, finds the session corresponding to the ServerID, and forwards the request (RETRIEVE request) to the OCF gateway. The RETRIEVE request in the operation may include /path.

For example, the request forwarded to the OCF gateway in the operation may include: RETRIEVE /light.

At S1235, after receiving the request, the gateway finds Entry: <550E8400-E29B-41D4-A716-446655440000, 11111111, /light1/CoapCloudConf> according to the session.

At S1237, the gateway finds the corresponding server according to the ServerID in the Entry.

At S1239, the gateway forwards the request (RETRIEVE request) to the server. The request in the operation may include /path.

For example, the request forwarded to the server in the operation may include /light.

At S1241, after receiving the request, the server returns a response carrying the resource status.

In the embodiment of the present disclosure, the server device ID is corresponded to the cloud session, and the gateway can publish the resource instead of the device while maintaining the correspondence between the cloud resource and the server, thereby ensuring the remote access link to be unobstructed.

Based on the foregoing embodiments, an embodiment of the present disclosure provides an apparatus for publishing a resource. The apparatus includes units included therein and modules included in each unit, and may be implemented by a processor in the apparatus. Of course, the apparatus may also be implemented by a specific logic circuit. In the process of implementation, the processor may be a Central Processing Unit (CPU), a microprocessor (MPU), a Digital Signal Processor (DSP), a Field Programmable Gate Array (FPGA), or the like.

Figure 13:
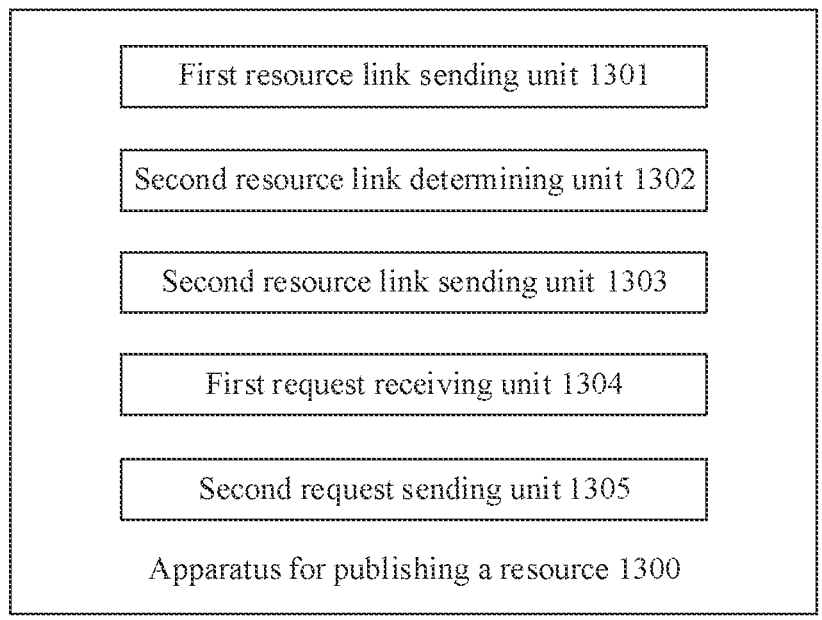
FIG. 13 is a schematic structural diagram of an apparatus for publishing a resource according to an embodiment of the present disclosure.

FIG. 13 is a schematic structural diagram of an apparatus for publishing a resource according to an embodiment of the present disclosure. As shown in FIG. 13, the apparatus for publishing the resource 1300 includes:

a first resource link receiving unit 1301, configured to receive a first resource link of a resource to be published from a server;

a second resource link determining unit 1302, configured to determine, based on an obtained identifier of the server and the first resource link of the resource to be published, a second resource link of the resource to be published; and a second resource link sending unit 1303, configured to send the second resource link of the resource to be published to a cloud platform. The second resource link of the resource to be published is used by the cloud platform to publish the resource to be published on a resource directory.

In some embodiments, the first resource link of the resource to be published includes an identifier of the resource to be published.

The second resource link determining unit 1302 is further configured to: add the identifier of the server to a location before the identifier of the resource to be published in the first resource link of the resource to be published, and modify an anchor of the first resource link to an identifier of the gateway, to obtain the second resource link.

In some embodiments, the apparatus for publishing the resource 1300 further includes:

a first request receiving unit 1304, configured to receive a first request from the cloud platform, where the first request includes an identifier of the resource to be published and the identifier of the server in the location before the identifier of the resource to be published; and a second request sending unit 1305, configured to: delete the identifier of the server from the first request to obtain a second request, and send the second request to the server, where the first request or the second request indicates that the client is to obtain the status of the resource to be published.

Figure 14:
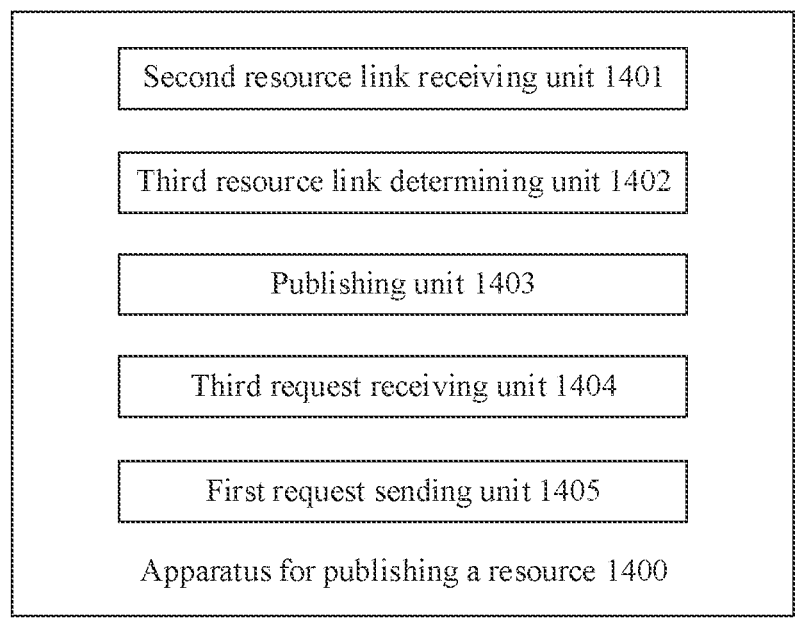
FIG. 14 is a schematic structural diagram of another apparatus for publishing a resource according to an embodiment of the present disclosure.

FIG. 14 is a schematic structural diagram of another apparatus for publishing a resource according to an embodiment of the present disclosure. As shown in FIG. 14, the apparatus for publishing the resource 1400 includes:

a second resource link receiving unit 1401, configured to receive a second resource link of a resource to be published from a gateway;

a third resource link determining unit 1402, configured to determine, based on an obtained identifier of the gateway and the second resource link of the resource to be published, a third resource link of the resource to be published; and a publishing unit 1403, configured to publish, based on the third resource link of the resource to be published, the resource to be published on a resource directory.

In some embodiments, an anchor of the second resource link is the identifier of the gateway, and the second resource link includes an identifier of the resource to be published and an identifier of a server in the location before the identifier of the resource to be published.

The third resource link determining unit 1402 is further configured to add the identifier of the gateway to a location before the identifier of the server in the second resource link of the resource to be published to obtain the third resource link of the resource to be published.

In some embodiments, the apparatus for publishing the resource 1400 further includes:

a third request receiving unit 1404, configured to receive a third request from a client, where the third request includes an identifier of the resource to be published, an identifier of the server in the location before the identifier of the resource to be published, and the identifier of the gateway in the location before the identifier of the server; and a first request sending unit 1405, configured to delete the identifier of the gateway from the third request to obtain a first request, and send the first request to the gateway.

The first request or the third request indicates that the client is to obtain the status of the resource to be published.

Figure 15:
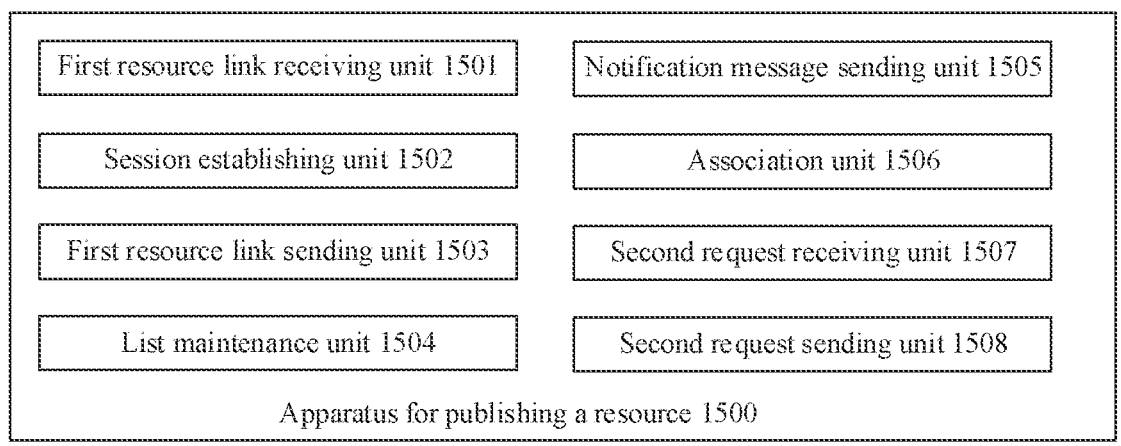
FIG. 15 is a schematic structural diagram of yet another apparatus for publishing a resource according to an embodiment of the present disclosure.

FIG. 15 is a schematic structural diagram of yet another apparatus for publishing a resource according to an embodiment of the present disclosure. As shown in FIG. 15, the apparatus for publishing the resource 1500 includes:

a first resource link receiving unit 1501, configured to receive a first resource link of a resource to be published from a server;

a session establishing unit 1502, configured to establish, based on an obtained identifier of the server, a new session between the gateway and a cloud platform; and a first resource link sending unit 1503, configured to send, based on the new session, the first resource link of the resource to be published to the cloud platform.

In some embodiments, the session establishing unit 1502 is further configured to: determine a new entry based on the identifier of the server, where the new entry includes the identifier of the server and an identifier of a cloud configuration resource; and establish, based on the identifier of the server and attribute information of the cloud configuration resource, the new session between the gateway and the cloud platform. The new session corresponds to the new entry, and the attribute information of the cloud configuration resource corresponds to the identifier of the cloud configuration resource.

In some embodiments, the new entry further includes an identifier of a resource directory client.

The first resource link sending unit 1503 is further configured to send, based on the new session and the resource directory client corresponding to the identifier of the resource directory client, the first resource link of the resource to be published to the cloud platform.

In some embodiments, the session establishing unit 1502 is further configured to: in response to determining that the server is a newly accessed device based on the identifier of the server, generate the identifier of the resource directory client corresponding to the identifier of the server and the identifier of the cloud configuration resource corresponding to the identifier of the server; and determine the new entry based on the identifier of the server, the identifier of the resource directory client, and the identifier of the cloud configuration resource.

In some embodiments, the apparatus for publishing the resource 1500 further includes a list maintenance unit 1504, a notification message sending unit 1505, and an association unit 1506. The list maintenance unit 1504 is configured to: obtain a first server list comprising at least one entry, where each of the at least one entry corresponds to a different server identifier; and add the new entry into the first server list to obtain a second server list, and save the second server list.

In some embodiments, the notification message sending unit 1505 is configured to: send a notification message to a mediator, where the notification message includes the identifier of the server and the identifier of the cloud configuration resource. The identifier of the server is used by the mediator to determine the attribute information of the cloud configuration resource, and the attribute information of the cloud configuration resource is used by the mediator to configure a cloud configuration resource corresponding to the identifier of the cloud configuration resource in the gateway.

In some embodiments, the session establishing unit 1502 is further configured to: send a first update request to the cloud platform, where the first update request includes the identifier of the server and the attribute information of the cloud configuration resource; receive a first update response from the cloud platform, where the first update response includes a user identifier and a new token; and establish, based on the user identifier and the new token, the new session between the gateway and the cloud platform.

In some embodiments, the association unit 1506 is configured to: save the user identifier and the new token, and associate the user identifier and the new token with the new entry.

In some embodiments, the session establishing unit 1502 is further configured to: send a second update request to the cloud platform, where the second update request includes the identifier of the server, the user identifier, and the new token; and receive a second update response from the cloud platform, where the second update response indicates that the new session has been successfully established.

In some embodiments, the apparatus for publishing the resource 1500 further includes:

a second request receiving unit 1507, configured to receive, based on the new session, a second request from the cloud platform, where the second request includes an identifier of the resource to be published; and a second request sending unit 1508, configured to: determine a new entry corresponding to the new session, and determine the identifier of the server from the new entry; and send the second request to a server corresponding to the identifier of the server.

Figure 16:
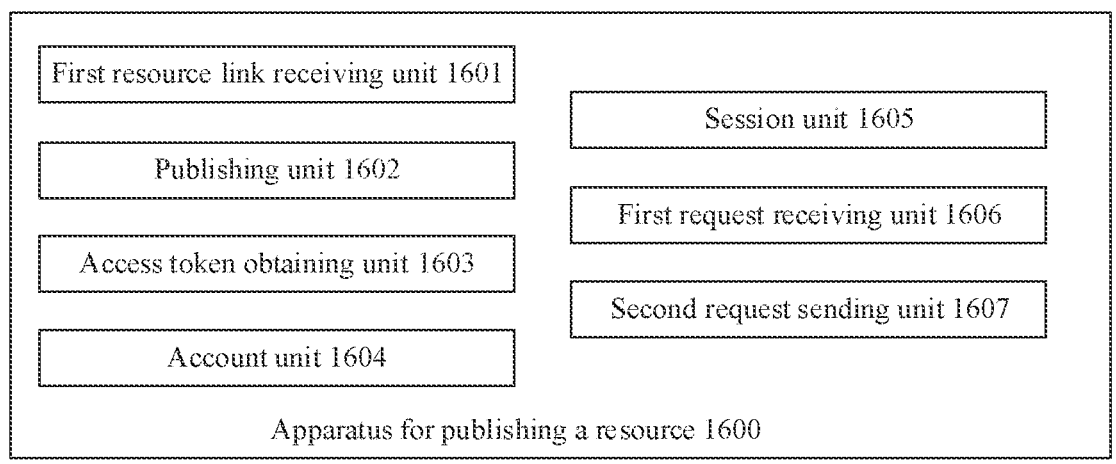
FIG. 16 is a schematic structural diagram of still another apparatus for publishing a resource according to an embodiment of the present disclosure.

FIG. 16 is a schematic structural diagram of still another apparatus for publishing a resource according to an embodiment of the present disclosure. As shown in FIG. 16, the apparatus for publishing the resource 1600 includes:

a first resource link receiving unit 1601, configured to receive, based on a new session between a gateway and a cloud platform, a first resource link of a resource to be published from the gateway; and a publishing unit 1602, configured to publish, based on the first resource link of the resource to be published, the resource to be published on a resource directory.

In some embodiments, the apparatus for publishing the resource 1600 further includes an access token obtaining unit 1603, which is configured to: receive, from a mediator, a token retrieve request for requesting an access token of a server; and send a response to the token retrieve request to the mediator. The response includes the access token of the server, and the access token is used by the gateway to establish the new session between the gateway and the cloud platform.

In some embodiments, the apparatus for publishing the resource 1600 further includes an account unit 1604, which is configured to: receive a first update request from the gateway, where the first update request includes an identifier of the server and attribute information of a cloud configuration resource, and the attribute information of the cloud configuration resource includes the access token; and send a first update response to the gateway, where the first update response includes a user identifier and a new token, and the user identifier and the new token instruct the gateway to send a second update request to the cloud platform to establish the new session between the gateway and the cloud platform.

In some embodiments, the apparatus for publishing the resource 1600 further includes a session unit 1605, which is configured to: receive a second update request from the gateway, where the second update request includes the identifier of the server, the user identifier, and the new token; and send a second update response to the gateway, where the second update response indicates that the new session has been successfully established.

In some embodiments, the apparatus for publishing the resource 1600 further includes:

a first request receiving unit 1606, configured to receive a first request from a client, where the first request includes an identifier of the resource to be published and an identifier of a server in a location before the identifier of the resource to be published;

a second request sending unit 1607, configured to send the second request to the gateway based on the new session.

The description of the above apparatus embodiments are similar to the description of the above method embodiments, and have similar beneficial effects as the method embodiments. For technical details not disclosed in the apparatus embodiments of the disclosure, please refer to the description of the method embodiments of the disclosure for understanding.

It should be noted that, in the embodiments of the disclosure, if the above method for publishing the resource is implemented in the form of software function modules and is sold or used as an independent product, it can also be stored in a computer readable storage medium. Based on this understanding, the technical solutions of the embodiments of the disclosure may be embodied in the form of a software product in essence or a part that contributes to related art. The computer software product is stored in a storage medium, and includes a number of instructions to enable a device to execute all or part of the method described in each embodiment of the disclosure. The aforementioned storage medium includes: a U disk, a mobile hard disk, a Read Only Memory (ROM), a magnetic disk or an optical disk and other medium that can store program codes. In this way, the embodiments of the disclosure are not limited to any specific hardware and software combination.

Figure 17:
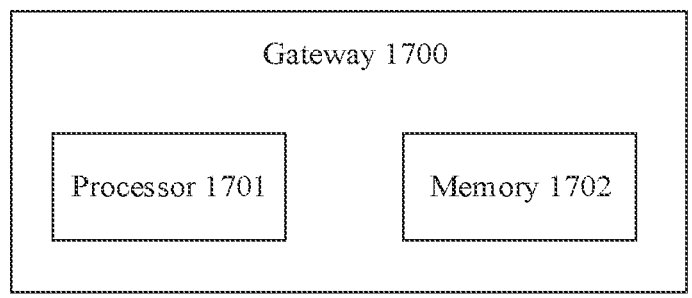
FIG. 17 is a schematic diagram of a hardware entity of a gateway according to an embodiment of the present disclosure.

FIG. 17 is a schematic diagram of a hardware entity of a gateway according to an embodiment of the present disclosure. As shown in FIG. 17, the hardware entity of the gateway 1700 includes a processor 1701 and a memory 1702. The memory 1702 stores a computer program executable by the processor 1701. The processor 1701 is configured to execute the program to perform the operations of the method of any one of the embodiments in FIGS. 3 to 12.

Figure 18:
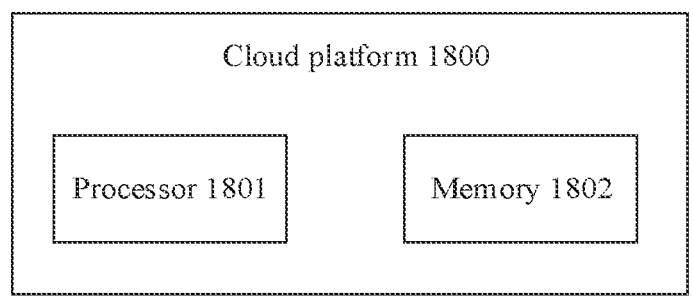
FIG. 18 is a schematic diagram of a hardware entity of a cloud platform according to an embodiment of the present disclosure.

FIG. 18 is a schematic diagram of a hardware entity of a cloud platform according to an embodiment of the present disclosure. As shown in FIG. 18, the hardware entity of the cloud platform 1800 includes a processor 1801 and a memory 1802. The memory 1802 stores a computer program executable by the processor 1801. The processor 1801 is configured to execute the program to perform the operations of the method of any one of the embodiments corresponding to FIGS. 3 to 4, 6 to 8, and 10 to 12.

The embodiment of the present disclosure provides a computer storage medium. The computer storage medium stores one or more programs that, when executed by one or more processors, cause the one or more processors to perform the operations of the methods performed by the gateway in the foregoing methods.

The embodiment of the present disclosure provides a computer storage medium. The computer storage medium stores one or more programs that, when executed by one or more processors, cause the one or more processors to perform the operations of the methods performed by the cloud platform in the foregoing methods.

Figure 19:
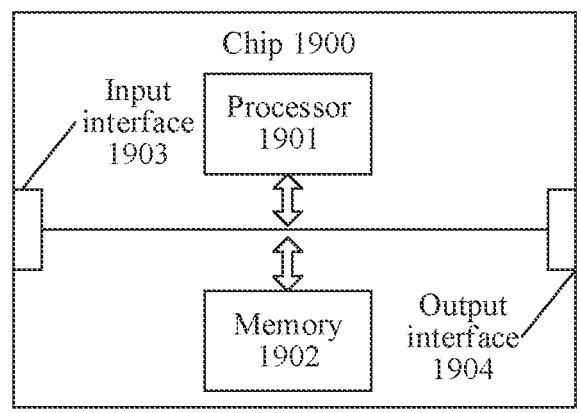
FIG. 19 is a schematic structural diagram of a chip according to an embodiment of the present disclosure.

FIG. 19 is a schematic structural diagram of a chip according to an embodiment of the present disclosure. The chip 1900 shown in FIG. 19 includes a processor 1901 that may involve and execute a computer program in a memory, to perform the operations of the methods performed by the gateway/cloud platform in the embodiments of the present disclosure.

Optionally, as shown in FIG. 19, the chip 1900 may further include a memory 1902. The processor 1901 may invoke and execute a computer program in the memory 1902 to perform the operations of the methods performed by the gateway/cloud platform in the embodiments of the present disclosure.

The memory 1902 may be a separate device independent of the processor 1901, or may be integrated into the processor 1901.

Optionally, the chip 1900 may further include an input interface 1903. The processor 1901 may control the input interface 1903 to communicate with other devices or chips, and specifically may obtain information or data transmitted by the other devices or chips.

Optionally, the chip 1900 may further include an output interface 1904. The processor 1901 may control the output interface 1904 to communicate with other devices or chips, and in particular may output information or data to other devices or chips.

Optionally, the chip may be applied to the network device in the embodiment of the present disclosure, and the chip may implement a corresponding flow implemented by the network device in each method in the embodiment of the present disclosure. For brevity, details are not described herein.

Optionally, the chip may be applied to the gateway/cloud platform in the embodiments of the present disclosure, and the chip may implement the corresponding operations implemented by the gateway/cloud platform in each method of the embodiments of the present disclosure. For brevity, details are not described herein.

It should be understood that the chip mentioned in the embodiments of the present disclosure may also be referred to as a system-level chip, a system chip, a chip system, or a system-on-chip.

The embodiment of the present disclosure provides a computer program product comprising a computer storage medium with a computer program code stored thereon, the computer program code comprising instructions executable by at least one processor, where the instructions, when executed by the at least one processor, implement the operations of the methods performed by the gateway/cloud platform in the foregoing methods.

Optionally, the computer program product may be applied to the gateway/cloud platform in the embodiments of the present disclosure, and the computer program instructions cause the computer to implement the corresponding operations implemented by the gateway/cloud platform in each method of the embodiments of the present disclosure. For brevity, details are not described herein It is to be understood that the processor in the embodiment of the disclosure may be an integrated circuit chip and has a signal processing capability. In an implementation process, each operation of the method embodiment may be completed by an integrated logical circuit of hardware in the processor or an instruction in a software form. The processor described above may be a universal processor, a Digital Signal Processor (DSP), an Application Specific Integrated Circuit (ASIC), a Field Programmable Gate Array (FPGA) or another programmable logical device, a discrete gate or a transistor logical device and a discrete hardware component. Each method, step and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a ROM, a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a programmable ROM (PROM), an Erasable PROM (EPROM), an Electrically EPROM (EEPROM) or a flash memory. The volatile memory may be a random access memory (RAM), and is used as an external high-speed cache. It is exemplarily but unlimitedly described that RAMS in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It should be understood that "one embodiment" or "an embodiment" or "the embodiment of the present disclosure" or "foregoing embodiment" mentioned throughout the specification means that specific features, structures, or characteristics related to the embodiment is included in at least one embodiment of the disclosure. Therefore, the appearances of "in one embodiment" or "in an embodiment" or "the embodiment of the present disclosure" or "foregoing embodiment" in various places throughout the specification do not necessarily refer to the same embodiment. In addition, these specific features, structures, or characteristics can be combined in one or more embodiments in any suitable manner. It should be understood that, in the various embodiments of the disclosure, the size of the serial number of the above-mentioned processes does not mean the order of execution, and the execution order of each process should be determined by its function and internal logic, and should not constitute any limitation to the implementation process of the embodiments of the disclosure. The serial numbers of the foregoing embodiments of the disclosure are only for description, and do not represent the advantages and disadvantages of the embodiments.

In the absence of special description, the gateway/cloud platform performs any of the operations in the embodiments of the present disclosure, which may be performed by a processor of the gateway/cloud platform. Unless otherwise specified, the embodiments of the present disclosure do not limit the order in which the gateway/cloud platform performs the following operations. In addition, the manner in which data is processed in different embodiments may be the same method or different methods. It should also be noted that any of the operations in the embodiments of the present disclosure may be independently performed by the gateway/cloud platform. That is, when performing any of the operations in the following embodiments, the gateway/cloud platform may not depend on the execution of other operations.

In the several embodiments provided in the disclosure, it should be understood that the disclosed gateway/cloud platform and method may be implemented in other ways. The gateway/cloud platform embodiments described above are only illustrative. For example, the division of the units is only a logical function division, and there may be other divisions in actual implementation, such as: multiple units or components can be combined, or can be integrated into another system, or some features can be ignored or not implemented. In addition, the coupling, or direct coupling, or communication connection between the components shown or discussed may be indirect coupling or communication connection through some interfaces, resource devices or units, and may be electrical, mechanical or other forms.

The methods disclosed in the several method embodiments provided herein may be arbitrarily combined without conflict to obtain new method embodiments.

The features disclosed in the several product embodiments provided herein can be arbitrarily combined without conflict to obtain new product embodiments.

The features disclosed in several methods or gateway/cloud platform embodiments provided herein may be arbitrarily combined without conflict to obtain new method embodiments or gateway/cloud platform embodiments.

A skilled person in the art can understand that all or part of the operations in the above method embodiments can be implemented by a program instructing relevant hardware. The foregoing program can be stored in a computer readable storage medium. When the program is executed, it executes the operations including the above method embodiments; and the foregoing storage medium includes: a storage resource device, a ROM, a magnetic disk or an optical disk and other medium that can store program codes.

Alternatively, if the above-mentioned integrated unit of the disclosure is implemented in the form of a software function module and sold or used as an independent product, it can also be stored in a computer readable storage medium. Based on this understanding, the technical solutions of the embodiments of the disclosure can be embodied in the form of a software product in essence or a part that contributes to related art. The computer software product is stored in a storage medium, and includes a number of instructions to enable the gateway/cloud platform to execute all or part of the method described in each embodiment of the disclosure. The aforementioned storage medium includes: a storage resource device, a ROM, a magnetic disk or optical disk and other medium that can store program codes.

In the embodiments of the present disclosure, descriptions of the same operations and the same contents in different embodiments may be referred to each other. In the embodiments of the present disclosure, the term "and" does not affect the sequence of operations. For example, the gateway/cloud platform executes A, and executes B, which can be that the gateway/cloud platform executes A, and then executes B, or the gateway/cloud platform executes B, and then executes A, or the gateway/cloud platform executes A and B simultaneously.

It should be understood that in the present disclosure, a message includes A, indicating that A is in the message. A message indicates A, indicating that the message includes the identifier of A, so that A can be obtained based on the identifier of A. It should be understood that different resource devices may perform the same operations in the same manner.

The above are only the implementation manners of the disclosure, but the protection scope of the disclosure is not limited to this. Any person skilled in the art can easily think of changes or substitutions within the technical scope disclosed in the disclosure, and they should be covered by the protection scope of the disclosure. Therefore, the protection scope of the disclosure should be subject to the protection scope of the claims.

INDUSTRIAL PRACTICALITY

The embodiments of the present disclosure provide a method and apparatus for publishing a resource, a gateway, a cloud platform, and a computer storage medium. According to the resource publishing solution of the present disclosure, the gateway can publish the resource instead of the server, so as to ensure that the link is unobstructed in the process of uploading the resource link to the cloud, so that the method for publishing the resource of the server is reasonable.

The invention claimed is:

1. A method for publishing a resource, comprising:
receiving, by a gateway, a first resource link of a resource to be published from a server;
determining, based on an obtained identifier of the server and the first resource link of the resource to be published, a second resource link of the resource to be published;
sending the second resource link of the resource to be published to a cloud platform, wherein the second resource link of the resource to be published is used by the cloud platform to publish the resource to be published on a resource directory;
receiving a first request from the cloud platform, wherein the first request comprises an identifier of the resource to be published and the identifier of the server in a location before the identifier of the resource to be published;
deleting the identifier of the server from the first request to obtain a second request; and
sending the second request to the server.

2. The method of claim 1, wherein the first resource link of the resource to be published comprises an identifier of the resource to be published; and
wherein determining, based on the obtained identifier of the server and the first resource link of the resource to be published, the second resource link of the resource to be published comprises: adding the identifier of the server to a location before the identifier of the resource to be published in the first resource link of the resource to be published, to obtain the second resource link.

3. The method of claim 2, further comprising:
modifying, by the gateway, an anchor of the first resource link to an identifier of the gateway.

4. The method of claim 1, wherein determining, based on the obtained identifier of the server and the first resource link of the resource to be published, the second resource link of the resource to be published comprises:
modifying, based on the identifier of the server, an attribute value of a href attribute of the first resource link of the resource to be published, to obtain the second resource link of the resource to be published.

5. The method of claim 4, wherein modifying, based on the identifier of the server, the attribute value of the href attribute of the first resource link of the resource to be published, to obtain the second resource link of the resource to be published, comprises:
modifying, attribute information or the attribute value of the href attribute in the first resource link of the resource to be published, from an identifier of the resource to be published to a sequence of the identifier of the server and the identifier of the resource to be published.

6. The method of claim 3, wherein the anchor of the first resource link is the identifier of the server.

7. The method of claim 1, wherein the first request and the second request is a retrieve request or an update request.

8. The method of claim 1, wherein at least one of the following applies:
the gateway is a cloud proxy;
the server is a resource device or a Device-to-Device (D2D) device; or
the cloud platform is a cloud device or an Open Connectivity Foundation (OCF) cloud.

9. A method for publishing a resource, comprising:
receiving, by a cloud platform, a second resource link of a resource to be published from a gateway, wherein the gateway determines the second resource link of the resource to be published based on an obtained identifier of a server and a first source link of the resource to be published received from the server;
determining, based on an obtained identifier of the gateway and the second resource link of the resource to be published, a third resource link of the resource to be published;
publishing, based on the third resource link of the resource to be published, the resource to be published on a resource directory;
receiving a third request from a client, wherein the third request comprises an identifier of the resource to be published, an identifier of the server in a location before the identifier of the resource to be published, and the identifier of the gateway in a location before the identifier of the server;
deleting the identifier of the gateway from the third request to obtain a first request; and
sending the first request to the gateway.

10. The method of claim 9, wherein an anchor of the second resource link is the identifier of the gateway, and the second resource link comprises an identifier of the resource to be published and an identifier of a server in a location before the identifier of the resource to be published; and
wherein determining, based on the obtained identifier of the gateway and the second resource link of the resource to be published, the third resource link of the resource to be published comprises: adding the identifier of the gateway in a location before the identifier of the server in the second resource link of the resource to be published to obtain the third resource link of the resource to be published.

11. The method of claim 10, wherein adding the identifier of the gateway to the location before the identifier of the server included in the second resource link of the resource to be published, comprises:
modifying, attribute information or an attribute value of a href attribute in the second resource link of the resource to be published, from a sequence of the identifier of the server and the identifier of the resource to be published to a sequence of the identifier of the gateway, the identifier of the server and the identifier of the resource to be published.

12. The method of claim 9, wherein the first request and the third request is a retrieve request or an update request.

13. A gateway, comprising:
a processor; and
a memory storing a computer program executable by the processor, wherein the processor is configured to:

receive, through a transceiver, a first resource link of a resource to be published from a server;

determine, based on an obtained identifier of the server and the first resource link of the resource to be published, a second resource link of the resource to be published;

send, through the transceiver, the second resource link of the resource to be published to a cloud platform, wherein the second resource link of the resource to be published is used by the cloud platform to publish the resource to be published on a resource directory;

receive, through the transceiver, a first request from the cloud platform, wherein the first request comprises an identifier of the resource to be published and the identifier of the server in a location before the identifier of the resource to be published;

delete the identifier of the server from the first request to obtain a second request; and send, through the transceiver, the second request to the server.

14. The gateway of claim 13, wherein the first resource link of the resource to be published comprises an identifier of the resource to be published; and the processor is further configured to: add the identifier of the server to a location before the identifier of the resource to be published in the first resource link of the resource to be published, to obtain the second resource link.

15. The gateway of claim 14, wherein the processor is further configured to modify an anchor of the first resource link to an identifier of the gateway.

16. The gateway of claim 13, wherein the processor is further configured to:

modify, based on the identifier of the server, an attribute value of a href attribute of the first resource link of the resource to be published, to obtain the second resource link of the resource to be published.

17. The gateway of claim 16, wherein the processor is specifically configured to:

modify, attribute information or the attribute value of the href attribute in the first resource link of the resource to be published, from an identifier of the resource to be published to a sequence of the identifier of the server and the identifier of the resource to be published.

* * * * *